United States Patent
Kung et al.

(10) Patent No.: US 11,601,959 B2
(45) Date of Patent: *Mar. 7, 2023

(54) METHOD AND APPARATUS FOR PRIORITIZATION BETWEEN UPLINK DATA AND SCHEDULING REQUEST IN A WIRELESS COMMUNICATION SYSTEM

(71) Applicant: ASUSTek Computer Inc., Taipei (TW)

(72) Inventors: Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,835

(22) Filed: Sep. 2, 2021

(65) Prior Publication Data

US 2021/0400684 A1     Dec. 23, 2021

Related U.S. Application Data

(63) Continuation of application No. 17/212,355, filed on Mar. 25, 2021, now Pat. No. 11,140,694.

(60) Provisional application No. 63/002,876, filed on Mar. 31, 2020.

(51) Int. Cl.
| | |
|---|---|
| *H04W 72/12* | (2023.01) |
| *H04W 72/1268* | (2023.01) |
| *H04W 72/04* | (2023.01) |
| *H04W 74/08* | (2009.01) |
| *H04W 72/044* | (2023.01) |

(52) U.S. Cl.
CPC ... *H04W 72/1242* (2013.01); *H04W 72/1268* (2013.01); *H04W 72/046* (2013.01); *H04W 74/0808* (2013.01)

(58) Field of Classification Search
CPC ......... H04W 72/1242; H04W 72/1268; H04W 72/046; H04W 74/0808; H04W 74/0833; H04W 72/1205; H04W 72/14; H04W 72/10; H04W 72/1284; H04W 80/02

See application file for complete search history.

(56) References Cited

U.S. PATENT DOCUMENTS

| | | |
|---|---|---|
| 2009/0316638 A1 | 12/2009 | Yi et al. |
| 2010/0091727 A1 | 4/2010 | Ishii |
| 2010/0098011 A1 | 4/2010 | Pelletier et al. |
| 2010/0322172 A1 | 12/2010 | Hsu |
| 2014/0064160 A1 | 3/2014 | Verger et al. |
| 2015/0078222 A1 | 3/2015 | Yang et al. |
| 2018/0324635 A1* | 11/2018 | Babaei ............... H04W 72/042 |
| 2018/0376394 A1 | 12/2018 | Hahn et al. |

(Continued)

*Primary Examiner* — Dinh Nguyen
(74) *Attorney, Agent, or Firm* — Cooper Legal Group LLC

(57) ABSTRACT

A method and apparatus are disclosed. In an example from the perspective of a User Equipment (UE) configured with logical channel based prioritization, the UE determines prioritization between a first uplink (UL) grant and a first scheduling request based on a first logical channel associated with triggering the first scheduling request, wherein the first UL grant and the first scheduling request overlap in time domain. The UE receives a second UL grant, wherein the second UL grant and a second scheduling request overlap in time domain. The UE prioritizes the second UL grant over the second scheduling request based on the second UL grant being addressed to a Temporary Cell Radio Network Temporary Identifier (C-RNTI) of the UE.

20 Claims, 13 Drawing Sheets

(56) References Cited

U.S. PATENT DOCUMENTS

| | | |
|---|---|---|
| 2019/0166576 A1 | 5/2019 | Kim et al. |
| 2019/0230690 A1 | 7/2019 | Akkarakaran et al. |
| 2019/0289638 A1* | 9/2019 | Kung .................... H04W 28/04 |
| 2019/0289661 A1 | 9/2019 | Chen |
| 2020/0137768 A1 | 4/2020 | Jose et al. |
| 2020/0267700 A1* | 8/2020 | Hosseini ........... H04W 72/1278 |
| 2021/0014880 A1* | 1/2021 | Jiang ................. H04W 72/1284 |
| 2021/0029724 A1* | 1/2021 | Tsai .................. H04W 72/1242 |

* cited by examiner dd # METHOD AND APPARATUS FOR PRIORITIZATION BETWEEN UPLINK DATA AND SCHEDULING REQUEST IN A WIRELESS COMMUNICATION SYSTEM

CROSS-REFERENCE TO RELATED APPLICATIONS

The present Application claims priority to and is a continuation of U.S. application Ser. No. 17/212,355, filed on Mar. 25, 2021, entitled "METHOD AND APPARATUS FOR PRIORITIZATION BETWEEN UPLINK DATA AND SCHEDULING REQUEST IN A WIRELESS COMMUNICATION SYSTEM", the entire disclosure of which is incorporated herein in its entirety by reference. U.S. application Ser. No. 17/212,355 claims the benefit of U.S. Provisional Patent Application Ser. No. 63/002,876 filed on Mar. 31, 2020, the entire disclosure of which is incorporated herein in its entirety by reference.

FIELD

This disclosure generally relates to wireless communication networks, and more particularly, to a method and apparatus for prioritization between uplink data and scheduling request in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE) configured with logical channel based prioritization, the UE determines prioritization between a first uplink (UL) grant and a first scheduling request based on a first logical channel associated with triggering the first scheduling request, wherein the first UL grant and the first scheduling request overlap in time domain. The UE receives a second UL grant, wherein the second UL grant and a second scheduling request overlap in time domain. The UE prioritizes the second UL grant over the second scheduling request based on the second UL grant being addressed to a Temporary Cell Radio Network Temporary Identifier (C-RNTI) of the UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: R2-2002341, Introduction of NR IIOT; R2-2001897, Introduction of eMIMO for NR; R2-2001924, Introduction of NR-U in 38.321. The standards and documents listed above are hereby expressly incorporated by reference in their entirety.

Figure 1:
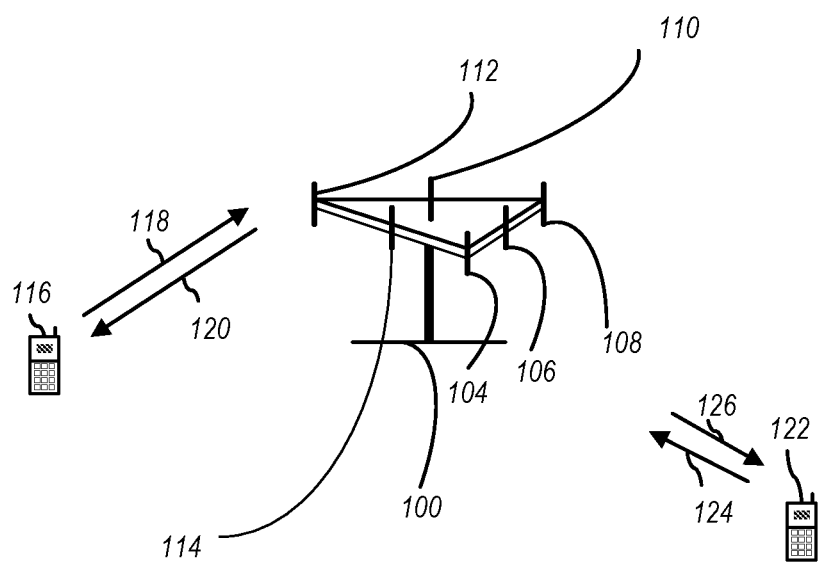
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
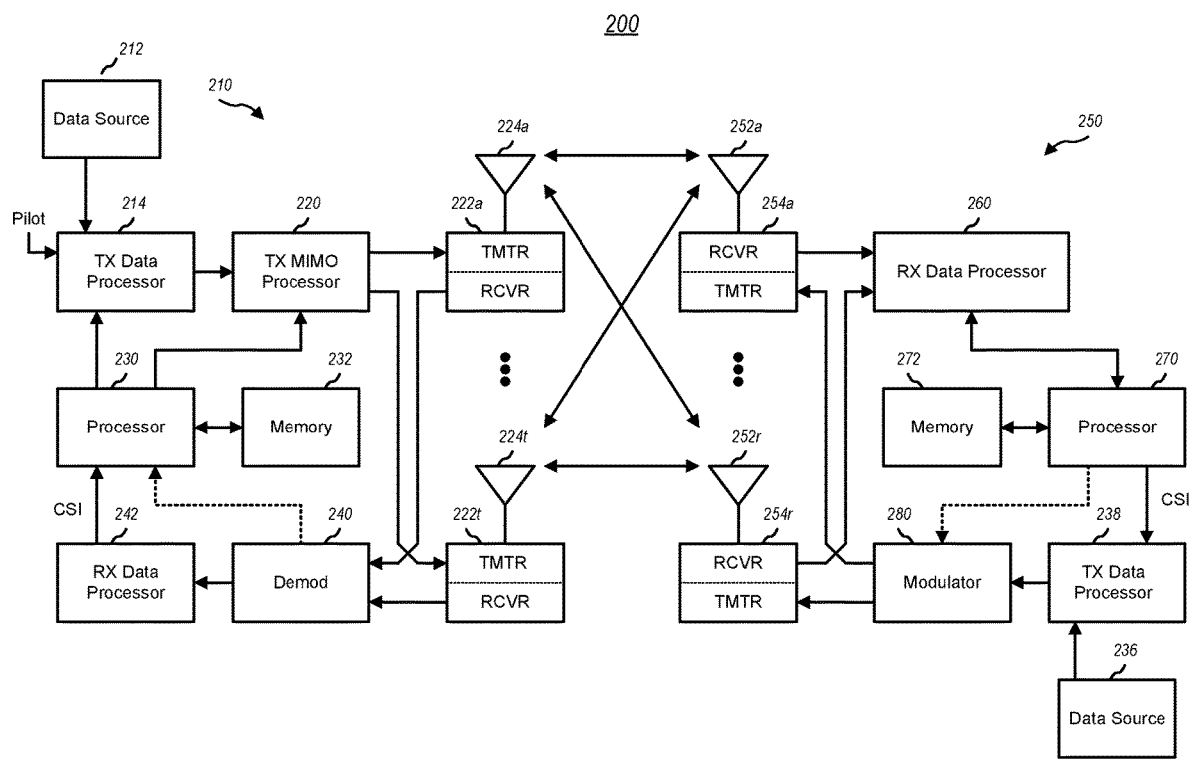
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
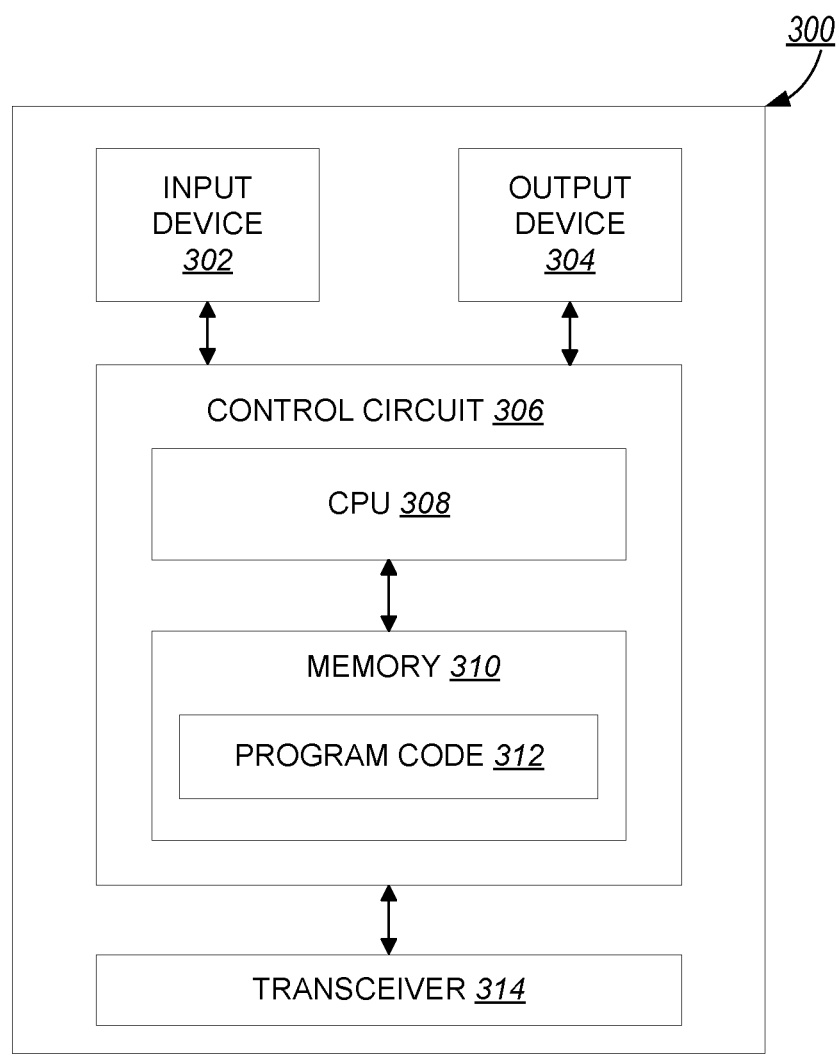
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
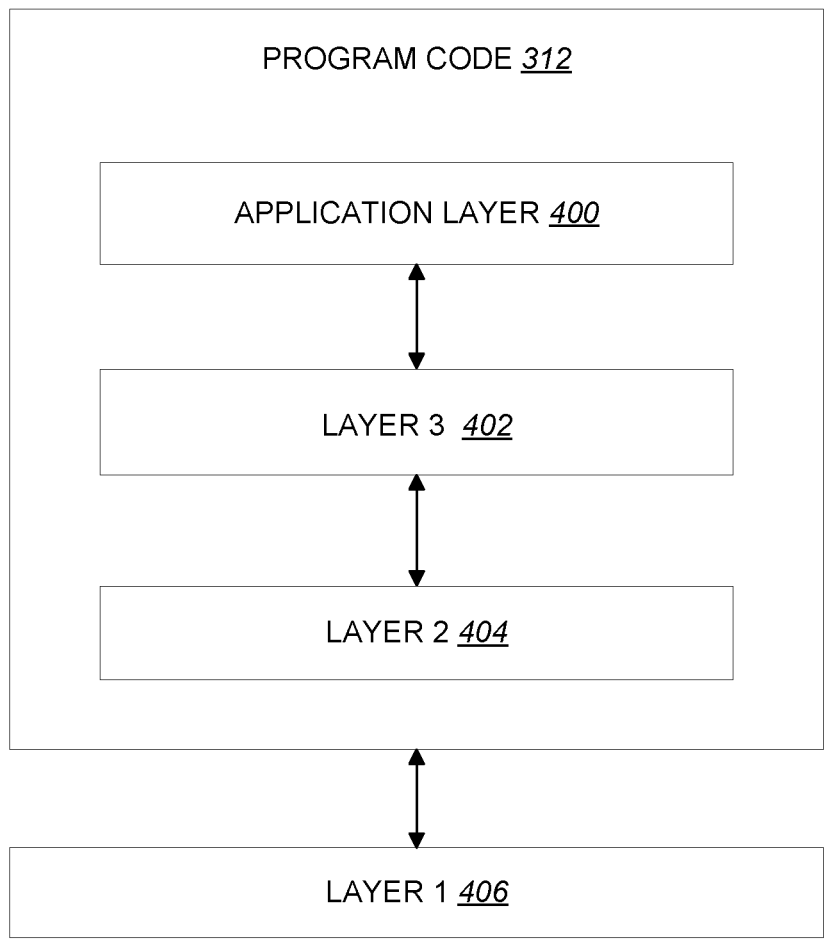
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In R2-2002341, prioritization between uplink (UL) grants and Scheduling Request in Medium Access Control (MAC) is introduced. Parts of R2-2002341 are quoted below:

5.4 UL-SCH data Transfer
5.4.1 UL Grant Reception
Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers. An uplink grant addressed to CS-RNTI with NDI=0 is considered as a configured uplink grant. An uplink grant addressed to CS-RNTI with NDI=1 is considered as a dynamic uplink grant.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:

1> if an uplink grant for this Serving Cell has been received on the PDCCH for the MAC entity's C-RNTI or Temporary C-RNTI; or
1> if an uplink grant has been received in a Random Access Response:
    2> if the uplink grant is for MAC entity's C-RNTI and if the previous uplink grant delivered to the HARQ entity for the same HARQ process was either an uplink grant received for the MAC entity's CS-RNTI or a configured uplink grant:
        3> consider the NDI to have been toggled for the corresponding HARQ process regardless of the value of the NDI.
    2> if the uplink grant is for MAC entity's C-RNTI, and the identified HARQ process is configured for a configured uplink grant:
        3> start or restart the configuredGrantTimer for the corresponding HARQ process, if configured.
    2> deliver the uplink grant and the associated HARQ information to the HARQ entity.
1> else if an uplink grant for this PDCCH occasion has been received for this Serving Cell on the PDCCH for the MAC entity's CS-RNTI:
    2> if the NDI in the received HARQ information is 1:
        3> consider the NDI for the corresponding HARQ process not to have been toggled;
        3> start or restart the configuredGrantTimer for the corresponding HARQ process, if configured;
        3> deliver the uplink grant and the associated HARQ information to the HARQ entity.
    2> else if the NDI in the received HARQ information is 0:
        3> if PDCCH contents indicate configured grant Type 2 deactivation:
            4> trigger configured uplink grant confirmation.
        3> else if PDCCH contents indicate configured grant Type 2 activation:
            4> trigger configured uplink grant confirmation;
            4> store the uplink grant for this Serving Cell and the associated HARQ information as configured uplink grant;
            4> initialise or re-initialise the configured uplink grant for this Serving Cell to start in the associated PUSCH duration and to recur according to rules in clause 5.8.2;
            4> stop the configuredGrantTimer for the corresponding HARQ process, if running;

For each Serving Cell and each configured uplink grant, if configured and activated, the MAC entity shall:

1> if the MAC entity is configured with lch-basedPrioritization; or
1> if the PUSCH duration of the configured uplink grant does not overlap with the PUSCH duration of an uplink grant received on the PDCCH or in a Random Access Response for this Serving Cell:
    2> set the HARQ Process ID to the HARQ Process ID associated with this PUSCH duration;
    2> if the configuredGrantTimer for the corresponding HARQ process is not running:
        3> consider the NDI bit for the corresponding HARQ process to have been toggled;
        3> deliver the configured uplink grant and the associated HARQ information to the HARQ entity.

Editor's Note: It is FFS whether SR/data prioritization can be a separate configurable parameter from data/data prioritization.

For configured uplink grants without harq-procID-offset, the HARQ Process ID associated with the first symbol of a UL transmission is derived from the following equation:

HARQ Process ID=[floor(CURRENT_symbol/periodicity)]modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211 [8].

For configured uplink grants with harq-procID-offset, the HARQ Process ID associated with the first symbol of a UL transmission is derived from the following equation:

HARQ Process ID=[floor(CURRENT_symbol/periodicity)]modulo nrofHARQ-Processes+harq-procID-offset.

NOTE 1: CURRENT_symbol refers to the symbol index of the first transmission occasion of a repetition bundle that takes place.
NOTE 2: A HARQ process is configured for a configured uplink grant where harq-procID-offset is not configured, if the configured uplink grant is activated and the associated HARQ process ID is less than nrofHARQ-Processes. A HARQ process is configured for a configured uplink grant where harq-procID-offset is configured, if the configured uplink grant is activated and the associated HARQ process ID is greater than or equal to harq-procID-offset and less than sum of harq-procID-offset and nrofHARQ-Processes for the configured grant configuration.
NOTE 3: If the MAC entity receives both a grant in a Random Access Response and an overlapping grant for its C-RNTI or CS-RNTI, requiring concurrent transmissions on the SpCell, the MAC entity may choose to continue with either the grant for its RA-RNTI or the grant for its C-RNTI or CS-RNTI.

NOTE 4: A HARQ process is not shared between different configured grant configurations.

For the MAC entity configured with lch-basedPrioritization, priority of an uplink grant is determined by the highest priority among priorities of the logical channels with data available that are multiplexed or can be multiplexed in the MAC PDU, according to the mapping restrictions as described in clause 5.4.3.1.2.

Editor's Note: Priority determination considering MAC CE is FFS.

When the MAC entity is configured, with lch-basedPrioritization, for each uplink grant which is not already a de-prioritized uplink grant:
1> if this uplink grant is addressed to CS-RNTI with NDI=1 or C-RNTI:
 2> if there is no overlapping PUSCH duration of a configured uplink grant, in the same BWP whose priority is higher than the priority of the uplink grant; and
 2> if there is no overlapping PUCCH resource with an SR transmission where the priority of the logical channel that triggered the SR is higher than the priority of the uplink grant:
  3> this uplink grant is a prioritized uplink grant;
  3> the other overlapping uplink grant(s), if any, is a de-prioritized uplink grant.
1> else if this uplink grant is a configured uplink grant:
 2> if there is no overlapping PUSCH duration of another configured uplink grant, in the same BWP, whose priority is higher than the priority of the uplink grant; and
 2> if there is no overlapping PUSCH duration of an uplink grant addressed to CS-RNTI with NDI=1 or C-RNTI, in the same BWP, whose priority is higher than or equal to the priority of the uplink grant; and
 2> if there is no overlapping PUCCH resource with an SR transmission where the priority of the logical channel that triggered the SR is higher than the priority of the uplink grant:
  3> this uplink grant is a prioritized uplink grant;
  3> the other overlapping uplink grant(s), if any, is a de-prioritized uplink grant.
NOTE: If there is overlapping PUSCH duration of at least two configured uplink grants whose priorities are equal, the prioritized uplink grant is determined by UE implementation.

5.4.2 HARQ Operation 5.4.2.1 HARQ Entity

The MAC entity includes a HARQ entity for each Serving Cell with configured uplink (including the case when it is configured with supplementaryUplink), which maintains a number of parallel HARQ processes.

The number of parallel UL HARQ processes per HARQ entity is specified in TS 38.214 [7].

Each HARQ process supports one TB.

Each HARQ process is associated with a HARQ process identifier. For UL transmission with UL grant in RA Response, HARQ process identifier 0 is used.

When the MAC entity is configured with pusch-AggregationFactor>1, the parameter pusch-AggregationFactor provides the number of transmissions of a TB within a bundle of the dynamic grant. After the initial transmission, pusch-AggregationFactor−1 HARQ retransmissions follow within a bundle. When the MAC entity is configured with repK>1, the parameter repK provides the number of transmissions of a TB within a bundle of the configured uplink grant. After the initial transmission, HARQ retransmissions follow within a bundle. For both dynamic grant and configured uplink grant, bundling operation relies on the HARQ entity for invoking the same HARQ process for each transmission that is part of the same bundle. Within a bundle, HARQ retransmissions are triggered without waiting for feedback from previous transmission according to pusch-AggregationFactor for a dynamic grant and repK for a configured uplink grant, respectively. Each transmission within a bundle is a separate uplink grant after the initial uplink grant within a bundle is delivered to the HARQ entity.

For each transmission within a bundle of the dynamic grant, the sequence of redundancy versions is determined according to clause 6.1.2.1 of TS 38.214 [7]. For each transmission within a bundle of the configured uplink grant, the sequence of redundancy versions is determined according to clause 6.1.2.3 of TS 38.214 [7].

For each uplink grant, the HARQ entity shall:
1> identify the HARQ process associated with this grant, and for each identified HARQ process:
 2> if the received grant was not addressed to a Temporary C-RNTI on PDCCH, and the NDI provided in the associated HARQ information has been toggled compared to the value in the previous transmission of this TB of this HARQ process; or
 2> if the uplink grant was received on PDCCH for the C-RNTI and the HARQ buffer of the identified process is empty; or
 2> if the uplink grant was received in a Random Access Response; or
 2> if the uplink grant was received on PDCCH for the C-RNTI in ra-ResponseWindow and this PDCCH successfully completed the Random Access procedure initiated for beam failure recovery; or
 2> if the uplink grant is part of a bundle of the configured uplink grant, and may be used for initial transmission according to clause 6.1.2.3 of TS 38.214 [7], and if no MAC PDU has been obtained for this bundle:
  3> if there is a MAC PDU in the Msg3 buffer and the uplink grant was received in a Random Access Response; or:
  3> if there is a MAC PDU in the Msg3 buffer and the uplink grant was received on PDCCH for the C-RNTI in ra-ResponseWindow and this PDCCH successfully completed the Random Access procedure initiated for beam failure recovery:
   4> obtain the MAC PDU to transmit from the Msg3 buffer.
   4> if the uplink grant size does not match with size of the obtained MAC PDU; and
   4> if the Random Access procedure was successfully completed upon receiving the uplink grant:
    5> indicate to the Multiplexing and assembly entity to include MAC subPDU(s) carrying MAC SDU from the obtained MAC PDU in the subsequent uplink transmission;
    5> obtain the MAC PDU to transmit from the Multiplexing and assembly entity.
  3> else if this uplink grant is a configured grant which is a prioritized uplink grant; and
  3> if the configured grant is configured with autonomousReTx; and 3> if the previous configured uplink grant for this HARQ process was de-prioritized; and
3> if a MAC PDU had already been obtained for this HARQ process; and
3> if a transmission of the obtained MAC PDU has not been performed:
    4> consider the MAC PDU has been obtained.
3> else if the MAC entity is not configured with lch-basedPrioritization; or
3> if this uplink grant is a prioritized uplink grant:
    4> obtain the MAC PDU to transmit from the Multiplexing and assembly entity, if any;
3> if a MAC PDU to transmit has been obtained:
    4> deliver the MAC PDU and the uplink grant and the HARQ information of the TB to the identified HARQ process;
    4> instruct the identified HARQ process to trigger a new transmission;
    4> if the uplink grant is a configured uplink grant; or
    4> if the uplink grant is addressed to C-RNTI, and the identified HARQ process is configured for a configured uplink grant:
        5> start or restart the configuredGrantTimer, if configured, for the corresponding HARQ process when the transmission is performed.
3> else:
    4> flush the HARQ buffer of the identified HARQ process.
2> else (i.e. retransmission):
    3> if the uplink grant received on PDCCH was addressed to CS-RNTI and if the HARQ buffer of the identified process is empty; or
    3> if the uplink grant is part of a bundle and if no MAC PDU has been obtained for this bundle; or
    3> if the uplink grant is part of a bundle of the configured uplink grant, and the PUSCH duration of the uplink grant overlaps with a PUSCH duration of another uplink grant received on the PDCCH or in a Random Access Response for this Serving Cell; or
    3> if the MAC entity is configured with lch-basedPrioritization and this uplink grant is not a prioritized uplink grant:
        4> ignore the uplink grant.
    3> else:
        4> deliver the uplink grant and the HARQ information (redundancy version) of the TB to the identified HARQ process;
        4> instruct the identified HARQ process to trigger a retransmission;
        4> if the uplink grant is addressed to CS-RNTI; or
        4> if the uplink grant is addressed to C-RNTI, and the identified HARQ process is configured for a configured uplink grant:
            5> start or restart the configuredGrantTimer, if configured, for the corresponding HARQ process when the transmission is performed.
When determining if NDI has been toggled compared to the value in the previous transmission the MAC entity shall ignore NDI received in all uplink grants on PDCCH for its Temporary C-RNTI.
    Editor's Note: How to fix "HARQ buffer is flushed when the autonomous (re)transmission is deprioritized again" is FFS.

5.4.2.2 HARQ Process

Each HARQ process is associated with a HARQ buffer.

New transmissions are performed on the resource and with the MCS indicated on either PDCCH, Random Access Response, or RRC. Retransmissions are performed on the resource and, if provided, with the MCS indicated on PDCCH, or on the same resource and with the same MCS as was used for last made transmission attempt within a bundle.

If the HARQ entity requests a new transmission for a TB, the HARQ process shall:
    1> store the MAC PDU in the associated HARQ buffer;
    1> store the uplink grant received from the HARQ entity;
    1> generate a transmission as described below.

If the HARQ entity requests a retransmission for a TB, the HARQ process shall:
    1> store the uplink grant received from the HARQ entity;
    1> generate a transmission as described below.

To generate a transmission for a TB, the HARQ process shall:
    1> if the MAC PDU was obtained from the Msg3 buffer; or
    1> if there is no measurement gap at the time of the transmission and, in case of retransmission, the retransmission does not collide with a transmission for a MAC PDU obtained from the Msg3 buffer:
        2> instruct the physical layer to generate a transmission according to the stored uplink grant.

5.4.5 Buffer Status Reporting

The Buffer Status reporting (BSR) procedure is used to provide the serving gNB with information about UL data volume in the MAC entity.

RRC configures the following parameters to control the BSR:
    periodicBSR-Timer;
    retxBSR-Timer;
    logicalChannelSR-DelayTimerApplied;
    logicalChannelSR-DelayTimer;
    logicalChannelSR-Mask;
    logicalChannelGroup.

Each logical channel may be allocated to an LCG using the logicalChannelGroup. The maximum number of LCGs is eight.

The MAC entity determines the amount of UL data available for a logical channel according to the data volume calculation procedure in TSs 38.322 [3] and 38.323 [4].

A BSR shall be triggered if any of the following events occur:
    UL data, for a logical channel which belongs to an LCG, becomes available to the MAC entity; and either
        this UL data belongs to a logical channel with higher priority than the priority of any logical channel containing available UL data which belong to any LCG; or
        none of the logical channels which belong to an LCG contains any available UL data.
    in which case the BSR is referred below to as 'Regular BSR';
    UL resources are allocated and number of padding bits is equal to or larger than the size of the Buffer Status Report MAC CE plus its subheader, in which case the BSR is referred below to as 'Padding BSR';
    retxBSR-Timer expires, and at least one of the logical channels which belong to an LCG contains UL data, in which case the BSR is referred below to as 'Regular BSR';

periodicBSR-Timer expires, in which case the BSR is referred below to as 'Periodic BSR'.

NOTE: When Regular BSR triggering events occur for multiple logical channels simultaneously, each logical channel triggers one separate Regular BSR.

For Regular BSR, the MAC entity shall:
1> if the BSR is triggered for a logical channel for which logicalChannelSR-DelayTimerApplied with value true is configured by upper layers:
  2> start or restart the logicalChannelSR-DelayTimer.
1> else:
  2> if running, stop the logicalChannelSR-DelayTimer.

For Regular and Periodic BSR, the MAC entity shall:
1> if more than one LCG has data available for transmission when the MAC PDU containing the BSR is to be built:
  2> report Long BSR for all LCGs which have data available for transmission.
1> else:
  2> report Short BSR.

For Padding BSR, the MAC entity shall:
1> if the number of padding bits is equal to or larger than the size of the Short BSR plus its subheader but smaller than the size of the Long BSR plus its subheader:
  2> if more than one LCG has data available for transmission when the BSR is to be built:
    3> if the number of padding bits is equal to the size of the Short BSR plus its subheader:
      4> report Short Truncated BSR of the LCG with the highest priority logical channel with data available for transmission.
    3> else:
      4> report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
  2> else:
    3> report Short BSR.
1> else if the number of padding bits is equal to or larger than the size of the Long BSR plus its subheader:
  2> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered.

The MAC entity shall:
1> if the Buffer Status reporting procedure determines that at least one BSR has been triggered and not cancelled:
  2> if UL-SCH resources are available for a new transmission and the UL-SCH resources can accommodate the BSR MAC CE plus its subheader as a result of logical channel prioritization:
    3> instruct the Multiplexing and Assembly procedure to generate the BSR MAC CE(s);
    3> start or restart periodicBSR-Timer except when all the generated BSRs are long or short Truncated BSRs;
    3> start or restart retxBSR-Timer.
  2> if a Regular BSR has been triggered and logicalChannelSR-DelayTimer is not running:
    3> if there is no UL-SCH resource available for a new transmission; or
    3> if the MAC entity is configured with configured uplink grant(s) and the Regular BSR was triggered for a logical channel for which logicalChannelSR-Mask is set to false; or
    3> if the UL-SCH resources available for a new transmission do not meet the LCP mapping restrictions (see clause 5.4.3.1) configured for the logical channel that triggered the BSR:
      4> trigger a Scheduling Request.

NOTE: UL-SCH resources are considered available if the MAC entity has an active configuration for either type of configured uplink grants, or if the MAC entity has received a dynamic uplink grant, or if both of these conditions are met. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU is transmitted and this PDU includes a Long or Short BSR MAC CE which contains buffer status up to (and including) the last event that triggered a BSR prior to the MAC PDU assembly.

NOTE: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

Each SR configuration corresponds to one or more logical channels. Each logical channel may be mapped to zero or one SR configuration, which is configured by RRC. The SR configuration of the logical channel that triggered the BSR (clause 5.4.5) (if such a configuration exists) is considered as corresponding SR configuration for the triggered SR.

RRC configures the following parameters for the scheduling request procedure:
  sr-ProhibitTimer (per SR configuration);
  sr-TransMax (per SR configuration).

The following UE variables are used for the scheduling request procedure:
  SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. All pending SR(s) shall be cancelled and each respective sr-ProhibitTimer shall be stopped when the UL grant(s) can accommodate all pending data available for transmission.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
   2> initiate a Random Access procedure (see clause 5.1) on the SpCell and cancel the pending SR.
1> else, for the SR configuration corresponding to the pending SR:
   2> when the MAC entity has an SR transmission occasion on the valid PUCCH resource for SR configured; and
   2> if sr-ProhibitTimer is not running at the time of the SR transmission occasion; and
   2> if the PUCCH resource for the SR transmission occasion does not overlap with a measurement gap:
      3> if the PUCCH resource for the SR transmission occasion does not overlap with a UL-SCH resource; or
      3> if the MAC entity is configured with lch-basedPrioritization, and the PUCCH resource for the SR transmission occasion overlaps with any UL-SCH resource(s), and the priority of the logical channel that triggered SR is higher than the priority of the uplink grant(s) for any UL-SCH resource(s) where the priority of the uplink grant is determined as specified in clause 5.4.1:
         4> the other overlapping uplink grant(s), if any, is a de-prioritized uplink grant;
         4> if SR_COUNTER<sr-TransMax:
            5> increment SR_COUNTER by 1;
            5> instruct the physical layer to signal the SR on one valid PUCCH resource for SR;
            5> start the sr-ProhibitTimer.
         4> else:
            5> notify RRC to release PUCCH for all Serving Cells;
            5> notify RRC to release SRS for all Serving Cells;
            5> clear any configured downlink assignments and uplink grants;
            5> clear any PUSCH resources for semi-persistent CSI reporting;
            5> initiate a Random Access procedure (see clause 5.1) on the SpCell and cancel all pending SRs.

In R2-2001897, Beam failure recovery for Secondary Cell and Scheduling Request is introduced. Parts of R2-2001897 are quoted below:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17), at most one PUCCH resource for SR is configured per BWP.

Each SR configuration corresponds to one or more logical channels or to SCell beam failure recovery. Each logical channel may be mapped to zero or one SR configuration, which is configured by RRC. The SR configuration of the logical channel that triggered the BSR (clause 5.4.5) or the SCell beam failure recovery (if such a configuration exists) is considered as corresponding SR configuration for the triggered SR.

RRC configures the following parameters for the scheduling request procedure:
   sr-ProhibitTimer (per SR configuration);
   sr-TransMax (per SR configuration).

The following UE variables are used for the scheduling request procedure:
   SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. Except for SCell beam failure recovery, all pending SR(s) triggered prior to the MAC PDU assembly shall be cancelled and each respective sr-ProhibitTimer shall be stopped when the MAC PDU is transmitted and this PDU includes a Long or Short BSR MAC CE which contains buffer status up to (and including) the last event that triggered a BSR (see clause 5.4.5) prior to the MAC PDU assembly. Except for SCell beam failure recovery, all pending SR(s) shall be cancelled and each respective sr-ProhibitTimer shall be stopped when the UL grant(s) can accommodate all pending data available for transmission. Pending SR triggered prior to the MAC PDU assembly for beam failure recovery of a SCell shall be cancelled when the MAC PDU is transmitted and this PDU includes a SCell BFR MAC CE or truncated SCell BFR MAC CE which contains beam failure recovery information of that SCell. If all the SR(s) triggered for SCell beam failure recovery are cancelled the MAC entity shall stop sr-ProhibitTimer of corresponding SR configuration.

Only PUCCH resources on a BWP which is active at the time of SR transmission occasion are considered valid.

As long as at least one SR is pending, the MAC entity shall for each pending SR:
1> if the MAC entity has no valid PUCCH resource configured for the pending SR:
   2> initiate a Random Access procedure (see clause 5.1) on the SpCell and cancel the pending SR.
1> else, for the SR configuration corresponding to the pending SR:
   2> when the MAC entity has an SR transmission occasion on the valid PUCCH resource for SR configured; and
   2> if sr-ProhibitTimer is not running at the time of the SR transmission occasion; and
   2> if the PUCCH resource for the SR transmission occasion does not overlap with a measurement gap; and
   2> if the PUCCH resource for the SR transmission occasion does not overlap with a UL-SCH resource:
      3> if SR_COUNTER<sr-TransMax:
         4> increment SR_COUNTER by 1;
         4> instruct the physical layer to signal the SR on one valid PUCCH resource for SR;
         4> start the sr-ProhibitTimer.
      3> else:
         4> notify RRC to release PUCCH for all Serving Cells;

4> notify RRC to release SRS for all Serving Cells;
4> clear any configured downlink assignments and uplink grants;
4> clear any PUSCH resources for semi-persistent CSI reporting;
4> initiate a Random Access procedure (see clause 5.1) on the SpCell and cancel all pending SRs.

NOTE 1: Except for SR for SCell beam failure recovery, the selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

NOTE 3: When the MAC entity has pending SR for SCell beam failure recovery and the MAC entity has one or more PUCCH resources overlapping with PUCCH resource for SCell beam failure recovery for the SR transmission occasion, the MAC entity considers only the PUCCH resource for SCell beam failure recovery as valid.

The MAC entity may stop, if any, ongoing Random Access procedure due to a pending SR for BSR which has no valid PUCCH resources configured, which was initiated by MAC entity prior to the MAC PDU assembly. The ongoing Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission. The ongoing Random Access procedure due to a pending SR for BFR of a SCell may be stopped when the MAC PDU is transmitted using a UL grant other than a UL grant provided by Random Access Response and this PDU contains a SCell BFR MAC CE or truncated SCell BFR MAC CE which includes beam failure recovery information of that SCell.

5.17 Beam Failure Detection and Recovery Procedure

The MAC entity may be configured by RRC per Serving Cell with a beam failure recovery procedure which is used for indicating to the serving gNB of a new SSB or CSI-RS when beam failure is detected on the serving SSB(s)/CSI-RS(s). Beam failure is detected by counting beam failure instance indication from the lower layers to the MAC entity. If beamFailureRecoveryConfig is reconfigured by upper layers during an ongoing Random Access procedure for beam failure recovery for SpCell, the MAC entity shall stop the ongoing Random Access procedure and initiate a Random Access procedure using the new configuration.

RRC configures the following parameters in the BeamFailureRecoveryConfig and the RadioLinkMonitoringConfig for the Beam Failure Detection and Recovery procedure:

beamFailureInstanceMaxCount for the beam failure detection;
beamFailureDetectionTimer for the beam failure detection;
beamFailureRecoveryTimer for the beam failure recovery procedure;
rsrp-ThresholdSSB: an RSRP threshold for the beam failure recovery;
powerRampingStep: powerRampingStep for the beam failure recovery;
powerRampingStepHighPriority: powerRampingStepHighPriority for the beam failure recovery;
preambleReceivedTargetPower: preambleReceivedTargetPower for the beam failure recovery;
preambleTransMax: preambleTransMax for the beam failure recovery;
scalingFactorBI: scalingFactorBI for the beam failure recovery;
ssb-perRACH-Occasion: ssb-perRACH-Occasion for the beam failure recovery;
ra-ResponseWindow: the time window to monitor response(s) for the beam failure recovery using contention-free Random Access Preamble;
prach-ConfigurationIndex: prach-ConfigurationIndex for the beam failure recovery;
ra-ssb-OccasionMaskIndex: ra-ssb-OccasionMaskIndex for the beam failure recovery;
ra-OccasionList: ra-OccasionList for the beam failure recovery.

Editors Note: The specific parameters for SCell BFR will be replicated here after they are settled.

The following UE variables are used for the beam failure detection procedure:

BFI_COUNTER: counter for beam failure instance indication which is initially set to 0.

The MAC entity shall for each Serving Cell configured for beam failure detection:

1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if the Serving Cell is SCell:
4> trigger a BFR for this Serving Cell;
3> else:
34> initiate a Random Access procedure (see clause 5.1) on the SpCell.
1> if the beamFailureDetectionTimer expires; or
1> if beamFailureDetectionTimer, beamFailureInstanceMaxCount, or any of the reference signals used for beam failure detection is reconfigured by upper layers associated with this Serving Cell:
2> set BFI_COUNTER to 0.
1> if the Serving Cell is SpCell and the Random Access procedure is successfully completed (see clause 5.1):
2> set BFI_COUNTER to 0;
2> stop the beamFailureRecoveryTimer, if configured;
2> consider the Beam Failure Recovery procedure successfully completed.
1> else if the Serving Cell is SCell; and
1> if a PDCCH addressed to C-RNTI indicating uplink grant for a new transmission is received for the HARQ process used for the transmission of the SCell BFR MAC CE or truncated SCell BFR MAC CE which contains beam failure recovery information of this Serving Cell; or
1> if the SCell is deactivated as specified in clause 5.9:
2> set BFI_COUNTER to 0;
2> consider the Beam Failure Recovery procedure successfully completed and cancel all the triggered BFRs for this Serving Cell.

The MAC entity shall:
- 1> if the Beam Failure Recovery procedure determines that at least one BFR has been triggered and not cancelled:
  - 2> if UL-SCH resources are available for a new transmission:
    - 3> if the UL-SCH resources can accommodate the SCell BFR MAC CE plus its subheader as a result of logical channel prioritization:
      - 4> instruct the Multiplexing and Assembly procedure to generate the SCell BFR MAC CE.
    - 3> else if the UL-SCH resources can accommodate the truncated SCell BFR MAC CE plus its subheader as a result of logical channel prioritization:
      - 4> instruct the Multiplexing and Assembly procedure to generate the truncated SCell BFR MAC CE.
  - 2> else:
    - 3> trigger the Scheduling Request for SCell beam failure recovery.

Figure 5:
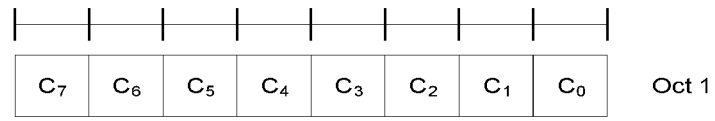
FIG. 5 is a diagram of a listen-before-talk (LBT) failure Medium Access Control (MAC) Control Element (CE) of one octet according to one exemplary embodiment.
Figure 6:
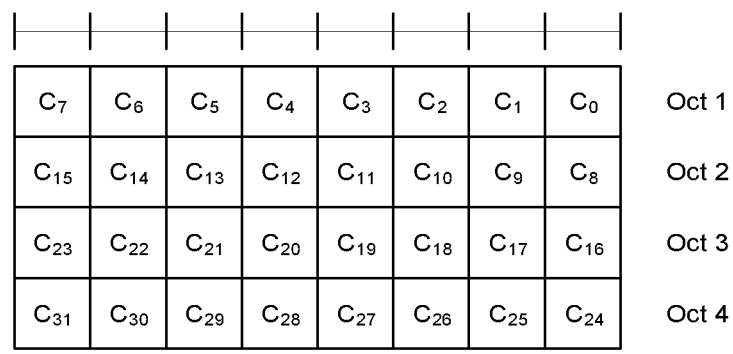
FIG. 6 is a diagram of a LBT failure MAC CE of four octets according to one exemplary embodiment.

In R2-2001924, listen-before-talk (LBT) operation and Scheduling Request associated with LBT failure is introduced. Notably, FIG. 6.1.3.XX-1 of Section 6.1.3.XX of R2-2001924, entitled "LBT failure MAC CE of one octet", is reproduced herein as FIG. 5. FIG. 6.1.3.XX-1 of Section 6.1.3.XX of R2-2001924, entitled "LBT failure MAC CE of four octets", is reproduced herein as FIG. 6. Parts of R2-2001924 are quoted below:

3.1 Definitions

Listen Before Talk: A procedure according to which transmissions are not performed if the channel is identified as being occupied, see TS 37.213.

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel and for consistent LBT failure (see clause 5.X), at most one PUCCH resource for SR is configured per BWP.

Each SR configuration corresponds to one or more logical channels and/or to consistent LBT failure. Each logical channel, and consistent LBT failure, may be mapped to zero or one SR configuration, which is configured by RRC. The SR configuration of the logical channel that triggered the BSR (clause 5.4.5) or the consistent LBT failure (clause 5.X) (if such a configuration exists) is considered as corresponding SR configuration for the triggered SR.

RRC configures the following parameters for the scheduling request procedure:
- sr-ProhibitTimer (per SR configuration);
- sr-TransMax (per SR configuration).

The following UE variables are used for the scheduling request procedure:
- SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled. All pending SR(s) for BSR triggered prior to the MAC PDU assembly shall be cancelled and each respective sr-ProhibitTimer shall be stopped when the MAC PDU is transmitted, regardless of LBT failure indication from lower layers, and this PDU includes a Long or Short BSR MAC CE which contains buffer status up to (and including) the last event that triggered a BSR (see clause 5.4.5) prior to the MAC PDU assembly. All pending SR(s) for BSR shall be cancelled and each respective sr-ProhibitTimer shall be stopped when the UL grant(s) can accommodate all pending data available for transmission.

The MAC entity shall for each pending SR triggered by consistent LBT failure:
- 1> if a MAC PDU is transmitted, regardless of LBT failure indication from lower layers, and the MAC PDU includes an LBT failure MAC CE that indicates consistent LBT failure for the Serving Cell that triggered this SR; or
- 1> if the corresponding consistent LBT failure is cancelled (see clause 5.X):
  - 2> cancel the pending SR and stop the corresponding sr-ProhibitTimer.

Only PUCCH resources on a BWP which is active at the time of SR transmission occasion are considered valid.

As long as at least one SR is pending, the MAC entity shall for each pending SR:
- 1> if the MAC entity has no valid PUCCH resource configured for the pending SR:
  - 2> initiate a Random Access procedure (see clause 5.1) on the SpCell and cancel the pending SR.
- 1> else, for the SR configuration corresponding to the pending SR:
  - 2> when the MAC entity has an SR transmission occasion on the valid PUCCH resource for SR configured; and
  - 2> if sr-ProhibitTimer is not running at the time of the SR transmission occasion; and
  - 2> if the PUCCH resource for the SR transmission occasion does not overlap with a measurement gap; and
  - 2> if the PUCCH resource for the SR transmission occasion does not overlap with a UL-SCH resource:
    - 3> if SR_COUNTER<sr-TransMax:
      - 4> instruct the physical layer to signal the SR on one valid PUCCH resource for SR;
      - 4> if LBT failure indication is not received from lower layers:
        - 5> increment SR_COUNTER by 1;
        - 5> start the sr-ProhibitTimer.
    - 3> else:
      - 4> notify RRC to release PUCCH for all Serving Cells;
      - 4> notify RRC to release SRS for all Serving Cells;
      - 4> clear any configured downlink assignments and uplink grants;
      - 4> clear any PUSCH resources for semi-persistent CSI reporting;
      - 4> initiate a Random Access procedure (see clause 5.1) on the SpCell and cancel all pending SRs.

NOTE 1: The selection of which valid PUCCH resource for SR to signal SR on when the MAC entity has more than one overlapping valid PUCCH resource for the SR transmission occasion is left to UE implementation.

NOTE 2: If more than one individual SR triggers an instruction from the MAC entity to the PHY layer to signal the SR on the same valid PUCCH resource, the SR_COUNTER for the relevant SR configuration is incremented only once.

NOTE 3: For a UE operating in a semi-static channel access mode as described in TS 37.213 [XX], PUCCH resources overlapping with the idle time of a fixed frame period are not considered valid.

The MAC entity may stop, if any, ongoing Random Access procedure due to a pending SR for BSR which has no valid PUCCH resources configured, which was initiated by MAC entity prior to the MAC PDU assembly. Such a Random Access procedure may be stopped when the MAC PDU is transmitted, regardless of LBT failure indication from lower layers, using a UL grant other than a UL grant provided by Random Access Response, and this PDU includes a BSR MAC CE which contains buffer status up to (and including) the last event that triggered a BSR (see clause 5.4.5) prior to the MAC PDU assembly, or when the UL grant(s) can accommodate all pending data available for transmission.

5.X LBT Operation

5.X.1 General

The lower layer may perform an LBT procedure, see TS 37.213 [XX], according to which a transmission is not performed if the channel is identified as being occupied. When lower layer performs an LBT procedure before a transmission and the transmission is not performed, an LBT failure indication is sent to the MAC entity from lower layers. Unless otherwise specified, when LBT procedure is performed, actions related to "is transmitted" and "transmission is performed" shall not be performed if an LBT failure indication is received from lower layers.

5.X.2 LBT Failure Detection and Recovery Procedure

The MAC entity may be configured by RRC with a consistent LBT failure recovery procedure. Consistent LBT failure is detected per UL BWP by counting LBT failure indications, for all UL transmissions, from the lower layers to the MAC entity.

RRC configures the following parameters in the lbt-FailureRecoveryConfig:

lbt-FailureInstanceMaxCount for the consistent LBT failure detection;

lbt-FailureDetectionTimer for the consistent LBT failure detection;

The following UE variable is used for the consistent LBT failure detection procedure:

LBT_COUNTER: counter for LBT failure indication which is initially set to 0.

For each activated Serving Cell configured with lbt-FailureRecoveryConfig, the MAC entity shall:

1> if LBT failure indication has been received from lower layers:
2> start or restart the lbt-FailureDetectionTimer;
2> increment LBT_COUNTER by 1;
2> if LBT_COUNTER>=lbt-FailureInstanceMaxCount:
3> trigger consistent LBT failure for the active UL BWP in this Serving Cell;
3> if this Serving Cell is the SpCell:
4> if consistent LBT failure has been triggered in all UL BWPs configured with PRACH occasions on same carrier in this Serving Cell:
5> indicate consistent LBT failure to upper layers.
4> else:
5> stop any ongoing Random Access procedure in this Serving Cell;
5> switch the active UL BWP to an UL BWP, on same carrier in this Serving Cell, configured with PRACH occasion and for which consistent LBT failure has not been triggered;
5> initiate a Random Access Procedure (as specified in clause 5.1.1).

1> if the lbt-FailureDetectionTimer expires; or
1> if lbt-FailureDetectionTimer or lbt-FailureInstanceMaxCount is reconfigured by upper layers:
2> set LBT_COUNTER to 0.

The MAC entity shall:
1> if consistent LBT failure has been triggered, and not cancelled, in the SpCell; and
1> if UL-SCH resources are available for a new transmission in the SpCell and these UL-SCH resources can accommodate the LBT failure MAC CE plus its subheader as a result of logical channel prioritization:
2> instruct the Multiplexing and Assembly procedure to generate the LBT failure MAC CE.
1> else if consistent LBT failure has been triggered, and not cancelled, in at least one SCell:
2> if UL-SCH resources are available for a new transmission in a Serving Cell for which consistent LBT failure has not been triggered and these UL-SCH resources can accommodate the LBT failure MAC CE plus its subheader as a result of logical channel prioritization:
3> instruct the Multiplexing and Assembly procedure to generate the LBT failure MAC CE.
2> else:
3> trigger a Scheduling Request for LBT failure MAC CE.
1> if a MAC PDU is transmitted and this PDU includes the LBT failure MAC CE:
2> cancel the triggered consistent LBT failure in SCell(s) indicating consistent LBT failure in the transmitted LBT failure MAC CE.
1> if consistent LBT failure is triggered and not cancelled in the active UL BWP of the SpCell; and
1> the Random Access procedure is considered successfully completed (see clause 5.1) in the SpCell:
2> cancel the triggered consistent LBT failure(s) in the SpCell.

6.1.3.XX LBT Failure MAC CE

The LBT failure MAC CE of one octet is identified by a MAC subheader with LCID as specified in Table 6.2.1-2. It has a fixed size and consists of a single octet containing 8 C-fields as follows (FIG. 6.1.3.XX-1):

The LBT failure MAC CE of four octets is identified by a MAC subheader with LCID as specified in Table 6.2.1-2. It has a fixed size and consists of four octets containing 32 C-fields as follows (FIG. 6.1.3.XX-2):

$C_i$: If there is a Serving Cell configured for the MAC entity with ServCellIndex i as specified in TS 38.331 [5] and if consistent LBT failure have been triggered and not cancelled in this Serving Cell, the field is set to 1, otherwise the field is set to 0.

FIG. 6.1.3.XX-1: LBT Failure MAC CE of One Octet

FIG. 6.1.3.XX-2: LBT Failure MAC CE of Four Octets

In NR, to address overlapping between different uplink (UL) transmissions, a UE performs prioritization between overlapping UL grants (e.g., dynamic grant or configured grant) and/or Scheduling Requests (SRs) (such as discussed in R2-2002341). Overlapping may occur when at least two UL grants overlap with each other, such as where one or more resources of a first UL grant overlaps (in time, for example) with one or more resources of a second UL grant. Alternatively and/or additionally, overlapping may occur when an UL grant overlaps with a Scheduling Request (SR), such as where one or more resources of the UL grant overlaps (in time, for example) with one or more resources for transmission of the Scheduling Request. In some examples, if a first UL grant and a second UL grant overlap, a UE may prioritize the first UL grant over the second UL grant if the first UL grant is associated with a higher priority than the second UL grant. In an example, it may be determined that the first UL grant is associated with a higher priority than the second UL grant based on a determination that one or more priorities, associated with one or more logical channels (e.g., one or more data logical channels) associated with the first UL grant, are higher than one or more priorities associated with one or more logical channels (e.g., one or more data logical channels) associated with the second UL grant.

For prioritization between an UL grant (e.g., a configured UL grant and/or an UL grant addressed to a Configured Scheduling Radio Network Temporary Identifier (CS-RNTI) with NDI=1 or addressed to Cell Radio Network Temporary Identifier (C-RNTI)) and a Scheduling Request (where a Medium Access Control (MAC) entity associated with the UE is configured with logical channel (LCH) based prioritization (e.g., lch-basedPrioritization), for example), the UE may determine the prioritization based on one or more logical channels that triggered the Scheduling Request (and/or one or more logical channels associated with the UL grant). For example, the UE may prioritize an UL grant over a Scheduling Request if one or more logical channels associated with the UL grant have a priority higher than a priority of a logical channel that triggered the Scheduling Request.

Figure 7:
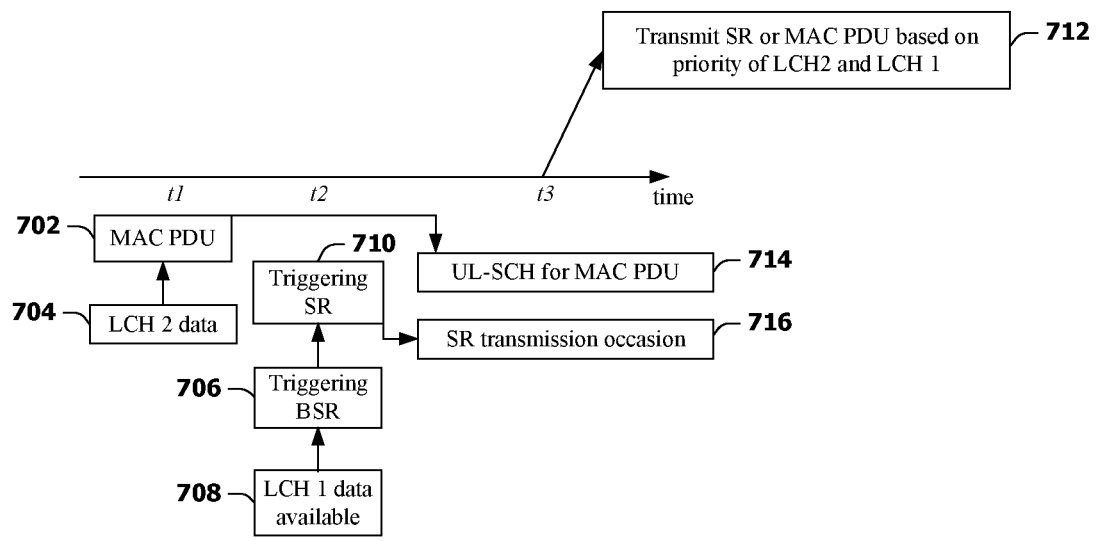
FIG. 7 illustrates an example scenario associated with a UE configured with logical channel based prioritization according to one exemplary embodiment.

FIG. 7 illustrates an example scenario associated with a UE configured with logical channel based prioritization. The UE may generate a MAC Protocol Data Unit (PDU) 702 comprising first data 704 (shown as "LCH 2 data" in FIG. 7) associated with a logical channel 2 (LCH 2). The UE may have an Uplink Shared Channel (UL-SCH) resource 714 at timing t3. The UL-SCH resource 714 may be associated with a configured grant and/or a dynamic grant. The MAC PDU 702 may be generated at timing t1 based on the UL-SCH resource 714 (e.g., the MAC PDU 702 may be generated at timing t1 in response to being configured and/or scheduled with the UL-SCH resource 714). The UE may trigger 706 a Buffer Status Reporting (BSR) procedure in response to a logical channel 1 (LCH 1) having second data 708 (shown as "LCH 1 data available" in FIG. 7) available for transmission (e.g., the UE may trigger 706 the BSR procedure in response to the second data 708 becoming available for transmission). At timing t2, the UE may trigger 710 a Scheduling Request (SR) in response to the BSR procedure and/or in response to triggering 706 the BSR procedure. The Scheduling Request is associated with a Scheduling Request transmission occasion 716 at the timing t3. The Scheduling Request transmission occasion 716 and the UL-SCH resource 714 overlap in time domain. The UE determines whether to transmit the Scheduling Request or to transmit the MAC PDU 702 at the timing t3 based on a logical channel priority of the logical channel 1 (LCH 1) and a logical channel priority of the logical channel 2 (LCH 2). At the timing t3, the UE performs a transmission 712, comprising the Scheduling Request or the MAC PDU 702, based on the determination of whether to transmit the Scheduling Request or to transmit the MAC PDU 702. In an example, if the logical channel priority of the logical channel 1 (LCH 1) is higher than the logical channel priority of the logical channel 2 (LCH 2), the UE may determine to transmit the Scheduling Request at the timing t3 (e.g., the transmission 712 may comprise the Scheduling Request). Alternatively and/or additionally, if the logical channel priority of the logical channel 1 (LCH 1) is lower than the logical channel priority of the logical channel 2 (LCH 2), the UE may determine to transmit the MAC PDU 702 at the timing t3 (e.g., the transmission 712 may comprise the MAC PDU 702).

However, some Scheduling Requests are triggered by beam failure recovery (BFR) and/or Listen-before-talk (LBT) failure and/or are not triggered by logical channels. Accordingly, prioritization between the Scheduling Requests and UL grants cannot be determined using logical channel prioritization techniques since the Scheduling Requests are not triggered by logical channels. UE behavior is not defined in a scenario in which an UL grant and a Scheduling Request triggered by BFR or LBT failure (e.g., consistent LBT failures) overlap with each other. Accordingly a UE may not be able to determine whether to transmit data associated with the UL grant or the Scheduling Request triggered by BFR or LBT failure.

Further, in some systems where a Scheduling Request overlaps with one or more UL grants associated with a random access procedure (e.g., the one or more UL grants may comprise an UL grant addressed to Temporary C-RNTI), a UE may prioritize the Scheduling Request over the one or more UL grants if a priority of a logical channel associated with the Scheduling Request is higher than a priority of the one or more UL grants, which may lead to obstruction of the random access procedure and/or may delay and/or prevent completion of the random access procedure.

Figure 8:
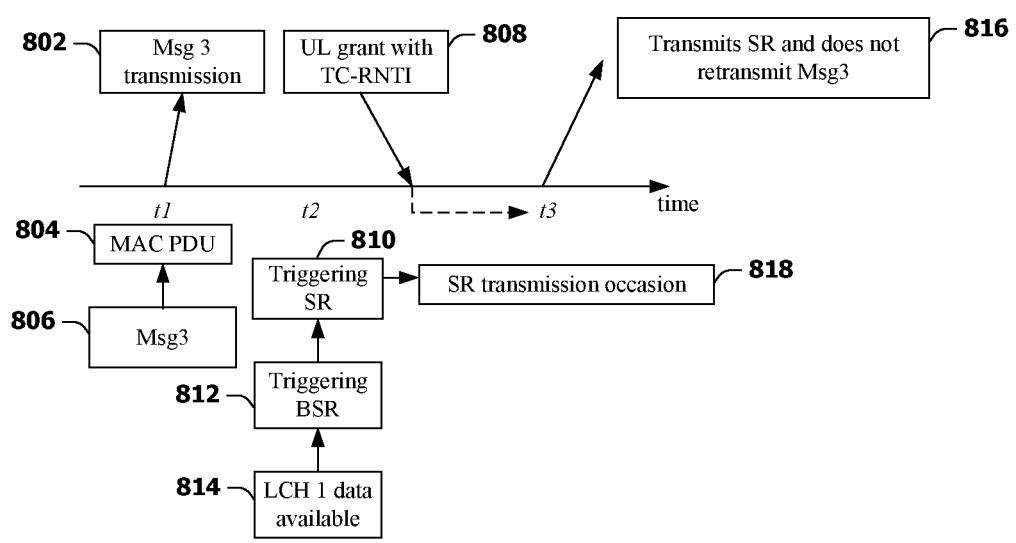
FIG. 8 illustrates an example scenario associated with a UE configured with logical channel based prioritization according to one exemplary embodiment.

FIG. 8 illustrates an example scenario associated with a UE configured with logical channel based prioritization. The UE performs a Msg3 transmission 802 to transmit a MAC PDU 804 at timing t1. The Msg3 transmission 802 may correspond to transmission of a Msg3 (Message 3) 806 (of a random access procedure, for example). The Msg3 806 may comprise the MAC PDU 804. The UE may trigger 812 a BSR procedure in response to a logical channel 1 (LCH 1) having data 814 available for transmission (e.g., the UE may trigger 812 the BSR procedure in response to the data 814 becoming available for transmission). At timing t2, the UE may trigger 810 a Scheduling Request (SR) in response to the BSR procedure and/or in response to triggering 812 the BSR procedure. The Scheduling Request is associated with a Scheduling Request transmission occasion 818 at timing t3. A network may schedule an UL grant 808 addressed to a Temporary C-RNTI (TC-RNTI). The UL grant 808 may be for Msg3 retransmission via an UL-SCH resource at the timing t3. Accordingly, the Scheduling Request transmission occasion 818 and the UL-SCH resource associated with the UL grant 808 overlap in time domain (at the timing t3). If a priority of the MAC PDU 804 is lower than a priority of the logical channel 1 (LCH 1), the UE prioritizes the Scheduling Request over the MAC PDU 804 and/or the UE transmits 816 the Scheduling Request without performing Msg3 retransmission which may lead to obstruction of the random access procedure and/or may delay and/or prevent completion of the random access procedure).

In some examples, a UE may prioritize an UL grant over an overlapping Scheduling Request, such as a Scheduling Request corresponding to a Scheduling Request transmission occasion overlapping an UL resource of the UL grant. For example, the UE may prioritize the UL grant over the overlapping Scheduling Request without considering one or more logical channels that triggered the overlapping Scheduling Request. Alternatively and/or additionally, a determination by the UE to prioritize the UL grant over the overlapping Scheduling Request may not be based on one or more logical channels that triggered the Scheduling Request. For example, prioritization of the UL grant over the overlapping Scheduling Request may not be based on the one or more logical channels that triggered the Scheduling Request (and/or the UL grant may be prioritized over the overlapping Scheduling Request regardless of a priority of the one or more logical channels). Alternatively and/or additionally, the UE may consider the UL grant to be a prioritized grant (e.g., prioritized over the overlapping Scheduling Request). Alternatively and/or additionally, the UE may consider the Scheduling Request to be a de-prioritized Scheduling Request (e.g., de-prioritized under the UL grant). In some examples, the UL grant is a retransmission UL grant (e.g., an UL grant for performing retransmission using an UL resource). Alternatively and/or additionally, the UL grant is addressed to a Temporary C-RNTI. In some examples, a UE may always prioritize an UL grant (e.g., a retransmission UL grant and/or an UL grant addressed to Temporary C-RNTI) over an overlapping Scheduling Request, such as a Scheduling Request corresponding to a Scheduling Request transmission occasion overlapping an UL resource of the UL grant.

Alternatively and/or additionally, the UE may prioritize a Scheduling Request over an overlapping UL grant, such as an UL grant associated with an UL resource overlapping a Scheduling Request transmission occasion corresponding to the Scheduling Request. For example, the UE may prioritize the Scheduling Request over the overlapping UL grant without considering one or more logical channels that triggered the Scheduling Request. Alternatively and/or additionally, a determination by the UE to prioritize the Scheduling Request over the overlapping UL grant may not be based on the one or more logical channels that triggered the Scheduling Request. For example, prioritization of the Scheduling Request over the overlapping UL grant may not be based on the one or more logical channels that triggered the Scheduling Request (and/or the Scheduling Request may be prioritized over the overlapping UL grant regardless of a priority of the one or more logical channels). Alternatively and/or additionally, the UE may consider the Scheduling Request to be a prioritized Scheduling Request (e.g., prioritized over the overlapping UL grant). Alternatively and/or additionally, the UE may consider the overlapping UL grant to be a de-prioritized UL grant (e.g., de-prioritized under the Scheduling Request). In some examples, the overlapping UL grant is a retransmission UL grant (e.g., an UL grant for performing retransmission using an UL resource). Alternatively and/or additionally, the overlapping UL grant is addressed to a Temporary C-RNTI. In some examples, a UE may always prioritize a Scheduling Request over an overlapping UL grant (e.g., a retransmission UL grant and/or an UL grant addressed to Temporary C-RNTI), such as an UL grant associated with an UL resource overlapping a Scheduling Request transmission occasion corresponding to the Scheduling Request.

In some examples, a UE may be configured with logical channel based prioritization (e.g., lch-basedPrioritization). In some examples, the UE may determine prioritization between an UL grant and a Scheduling Request in different ways (and/or using different techniques and/or rules) based on a type of UL grant of the UL grant.

In some examples, if one or more first conditions are met, the UE may prioritize an UL grant over an overlapping Scheduling Request (such as a Scheduling Request corresponding to a Scheduling Request transmission occasion overlapping an UL resource of the UL grant). In an example, if the one or more first conditions are met, the UE may prioritize the UL grant over the overlapping Scheduling Request without considering a priority of one or more logical channels that triggered the overlapping Scheduling Request (and/or without considering a priority of one or more logical channels that triggered the overlapping Scheduling Request). The one or more first conditions may be met if the UL grant is addressed to Temporary C-RNTI of the UE. Alternatively and/or additionally, the one or more first conditions may be met if the UL grant is a retransmission UL grant (e.g., an UL grant for performing retransmission using an UL resource).

In some examples, if the one or more first conditions are not met, the UE may determine prioritization between an UL grant and an overlapping Scheduling Request (such as a Scheduling Request corresponding to a Scheduling Request transmission occasion overlapping an UL resource of the UL grant) based on a first priority associated with the UL grant and/or a second priority associated with the overlapping Scheduling Request. In an example, the first priority may be a priority of one or more first logical channels associated with the UL grant and/or the second priority may be a priority of one or more second logical channels associated with the overlapping Scheduling Request. In an example, if the one or more first conditions are not met, the UE may prioritize the UL grant over the overlapping Scheduling Request if the first priority is higher than the second priority. Alternatively and/or additionally, if the one or more first conditions are not met, the UE may prioritize the overlapping Scheduling Request over the UL grant if the first priority is lower than the second priority. In some examples, the one or more first conditions are not met if the UL grant is not addressed to Temporary C-RNTI of the UE (and/or if the UL grant is addressed to a RNTI different than the Temporary C-RNTI).

Alternatively and/or additionally, if one or more second conditions are met, the UE may determine prioritization between an UL grant and an overlapping Scheduling Request (such as a Scheduling Request corresponding to a Scheduling Request transmission occasion overlapping an UL resource of the UL grant) based on a first priority associated with the UL grant and/or a second priority associated with the overlapping Scheduling Request. In an example, the first priority may be a priority of one or more first logical channels associated with the UL grant and/or the second priority may be a priority of one or more second logical channels associated with the overlapping Scheduling Request. In an example, if the one or more second conditions are met, the UE may prioritize the UL grant over the overlapping Scheduling Request if the first priority is higher than the second priority. Alternatively and/or additionally, if the one or more second conditions are met, the UE may prioritize the overlapping Scheduling Request over the UL grant if the first priority is lower than the second priority. In some examples, the one or more second conditions are met if the UL grant is addressed to CS-RNTI and/or C-RNTI (and/or other type of RNTI different than Temporary C-RNTI).

Figure 9:
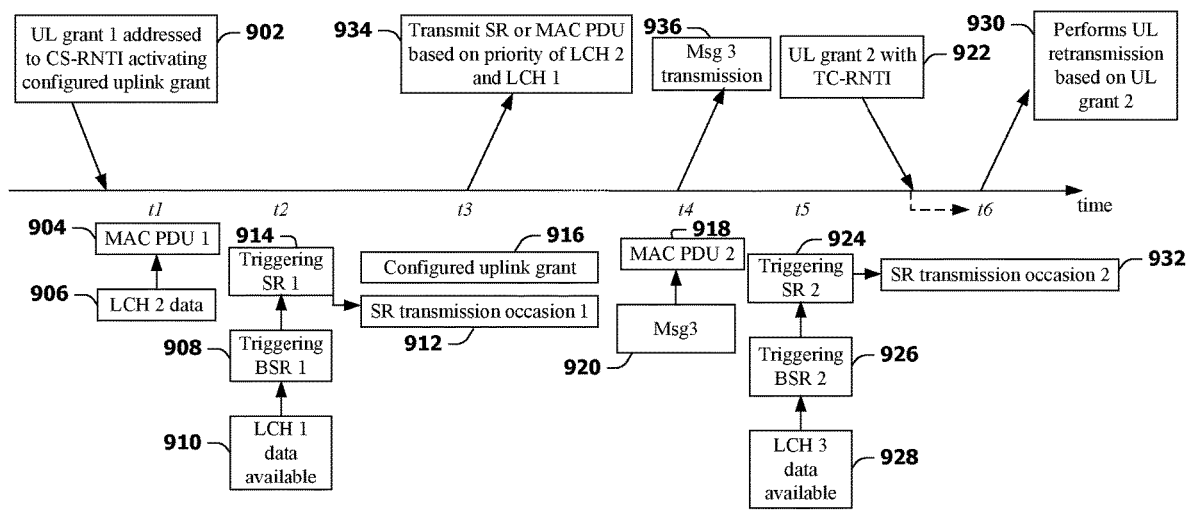
FIG. 9 illustrates an example scenario associated with a UE configured with logical channel based prioritization according to one exemplary embodiment.

FIG. 9 illustrates an example scenario associated with a UE configured with logical channel based prioritization. The UE receives a first UL grant 902 (UL grant 1) addressed to CS-RNTI. The first UL grant 902 (UL grant 1) may be for and/or indicative of activating a configured UL grant 916 at timing t3. In response to receiving the first UL grant 902 (UL grant 1), the UE may generate a first MAC PDU 904 (MAC PDU 1) comprising data 906 (LCH 2 data) associated with a logical channel 2 (LCH 2). The UE may trigger 908 a first BSR procedure (BSR 1) in response to a logical channel 1 (LCH 1) having data 910 available for transmission (e.g., the UE may trigger 908 the first BSR procedure (BSR 1) in response to the data 910 becoming available for transmission). At timing t2, the UE may trigger 914 a first Scheduling Request (SR 1) in response to the first BSR procedure (BSR 1) and/or in response to triggering 908 the first BSR procedure (BSR 1). The first Scheduling Request (SR 1) is associated with a first Scheduling Request transmission occasion 912 (SR transmission occasion 1) at the timing t3. Accordingly, the configured UL grant 916 and the Scheduling Request transmission occasion 912 (SR transmission occasion 1) overlap in time domain (at the timing t3). The UE determines whether to transmit the first MAC PDU 904 (MAC PDU 1) or the first Scheduling Request (SR 1) based on a first priority of the logical channel 1 (LCH 1) and a second priority of the logical channel 2 (LCH 2). At the timing t3, the UE performs a transmission 934, comprising the first Scheduling Request (SR 1) or the first MAC PDU 904 (MAC PDU 1), based on the determination of whether to transmit the first Scheduling Request (SR 1) or to transmit the first MAC PDU 904 (MAC PDU 1). In an example, if the first priority of the logical channel 1 (LCH 1) is higher than the second priority of the logical channel 2 (LCH 2), the UE may determine to transmit the first Scheduling Request (SR 1) at the timing t3 (e.g., the transmission 934 may comprise the first Scheduling Request (SR 1)). Alternatively and/or additionally, if the first priority of the logical channel 1 (LCH 1) is lower than the second priority of the logical channel 2 (LCH 2), the UE may determine to transmit the first MAC PDU 904 (MAC PDU 1) at the timing t3 (e.g., the transmission 934 may comprise the first MAC PDU 904). In some examples, the UE may determine prioritization between the first Scheduling Request (SR 1) and the configured UL grant 916 based on the first priority and/or the second priority based on a determination that the one or more first conditions are not met (and/or a determination that the one or more second conditions are met), such as based on a determination that the first UL grant 902 (UL grant 1) is addressed to CS-RNTI and/or based on a determination that the first UL grant 902 (UL grant 1) is not addressed to Temporary C-RNTI.

At timing t4, the UE performs a Msg3 transmission 936 to transmit a second MAC PDU 918 (MAC PDU 2). The Msg3 transmission 936 may correspond to a transmission of a Msg3 (Message 3) 920 of a random access procedure. The Msg3 may comprise the second MAC PDU 918 (MAC PDU 2). The UE may trigger 926 a second BSR procedure (BSR 2) in response to a logical channel 3 (LCH 3) having data 928 available for transmission (e.g., the UE may trigger 926 the second BSR procedure (BSR 2) in response to the data 928 becoming available for transmission). At timing t5, the UE may trigger 924 a second Scheduling Request (SR 2) in response to the second BSR procedure (BSR 2) and/or in response to triggering 926 the second BSR procedure (BSR 2). The second Scheduling Request (SR 2) is associated with a second Scheduling Request transmission occasion 932 (SR transmission occasion 2) at timing t6. A network may schedule a second UL grant 922 (UL grant 2) addressed to a Temporary C-RNTI (TC-RNTI). The second UL grant 922 (UL grant 2) may be indicative of performing an UL retransmission 930 at the timing t6. Accordingly, the UL retransmission 930 associated with the second UL grant 922 and the second Scheduling Request transmission occasion 932 (SR transmission occasion 2) overlap in time domain (at the timing t6). The UE performs the UL retransmission 930 based on the second UL grant 922 at the timing t6. In some examples, the UE may not transmit the second Scheduling Request (SR 2) at the second Scheduling Request transmission occasion 932 (SR transmission occasion 2). In some examples, the UE may prioritize the second UL grant 922 (and/or the UL retransmission 930) over the second Scheduling Request (SR 2) based on a determination that the one or more first conditions are met, such as based on a determination that the second UL grant 922 is addressed to the Temporary C-RNTI. Alternatively and/or additionally, the UE may prioritize the second UL grant 922 (and/or the UL retransmission 930) over the second Scheduling Request (SR 2) without considering a priority of the logical channel 3 (LCH 3) that triggered the second Scheduling Request (SR 2). Alternatively and/or additionally, the UE may perform the UL retransmission 930 at the timing t6 and/or may not transmit the second Scheduling Request (SR 2) at the timing t6, without considering the priority of the logical channel 3 (LCH 3), based on a determination that the one or more first conditions are met, such as based on a determination that the second UL grant 922 is addressed to the Temporary C-RNTI.

In some examples, a UE may prioritize a Scheduling Request over an overlapping UL grant (such as an UL grant associated with an UL resource overlapping a Scheduling Request transmission occasion corresponding to the Scheduling Request) based on a cause, a trigger and/or an event that triggered the Scheduling Request. In some examples, the Scheduling Request may be associated with a BFR (and/or a triggered BFR, such as a triggered BFR associated with one or more Serving Cells). For example, the Scheduling Request may be triggered in response to a BFR (and/or a triggered BFR, such as a triggered BFR associated with one or more Serving Cells). In some examples, the UE may prioritize the Scheduling Request over the overlapping UL grant if the Scheduling Request is associated with BFR (and/or a triggered BFR, such as a triggered BFR associated with one or more Serving Cells). For example, the Scheduling Request may be prioritized over the overlapping UL grant based on a determination that the Scheduling Request is associated with BFR (and/or a triggered BFR, such as a triggered BFR associated with one or more Serving Cells). In some examples, a determination by the UE to prioritize the Scheduling Request over the overlapping UL grant may not be based on one or more logical channels that triggered the Scheduling Request. Alternatively and/or additionally, the UE may consider the Scheduling Request to be a prioritized Scheduling Request (e.g., prioritized over the overlapping UL grant). Alternatively and/or additionally, the UE may consider the overlapping UL grant to be a de-prioritized UL grant (e.g., de-prioritized under the Scheduling Request).

In some examples, a UE may prioritize an UL grant over an overlapping Scheduling Request (such as a Scheduling Request corresponding to a Scheduling Request transmission occasion overlapping an UL resource of the UL grant) based on a cause, a trigger and/or an event that triggered the overlapping Scheduling Request. In some examples, the overlapping Scheduling Request may be associated with a BFR (and/or a triggered BFR, such as a triggered BFR associated with one or more Serving Cells). For example, the overlapping Scheduling Request may be triggered in response to a BFR (and/or a triggered BFR, such as a triggered BFR associated with one or more Serving Cells). In some examples, the UE may prioritize the UL grant over the overlapping Scheduling Request if the overlapping Scheduling Request is associated with BFR (and/or a triggered BFR, such as a triggered BFR associated with one or more Serving Cells). For example, the UL grant may be prioritized over the overlapping Scheduling Request based on a determination that the overlapping Scheduling Request is associated with BFR (and/or a triggered BFR, such as a triggered BFR associated with one or more Serving Cells). In some examples, a determination by the UE to prioritize the UL grant over the overlapping Scheduling Request may not be based on one or more logical channels that triggered the overlapping Scheduling Request. Alternatively and/or additionally, the UE may consider the UL grant to be a prioritized grant (e.g., prioritized over the overlapping Scheduling Request). Alternatively and/or additionally, the UE may consider the overlapping Scheduling Request to be a de-prioritized Scheduling Request (e.g., de-prioritized under the UL grant).

In an example in which a Scheduling Request is associated with a BFR, a UE may determine prioritization between the Scheduling Request and an overlapping UL grant (such as an UL grant associated with an UL resource overlapping a Scheduling Request transmission occasion corresponding to the Scheduling Request) based on one or more cells associated with the BFR.

For example, a UE may prioritize a Scheduling Request over an overlapping UL grant (such as an UL grant associated with an UL resource overlapping a Scheduling Request transmission occasion corresponding to the Scheduling Request) if the Scheduling Request is associated with a BFR associated with one or more Secondary Cells (e.g., the UE may prioritize the Scheduling Request over the overlapping UL grant based on a determination that the Scheduling Request is associated with the BFR associated with the one or more Secondary Cells). Alternatively and/or additionally, the UE may prioritize an UL grant over an overlapping Scheduling Request (such as a Scheduling Request corresponding to a Scheduling Request transmission occasion overlapping an UL resource of the UL grant) if the Scheduling Request is associated with a BFR associated with one or more Primary Cells (e.g., the UE may prioritize the UL grant over the overlapping Scheduling Request based on a determination that the overlapping Scheduling Request is associated with the BFR associated with the one or more Primary Cells).

Alternatively and/or additionally, a UE may prioritize a Scheduling Request over an overlapping UL grant (such as an UL grant associated with an UL resource overlapping a Scheduling Request transmission occasion corresponding to the Scheduling Request) if the Scheduling Request is associated with a BFR associated with one or more Primary Cells (e.g., the UE may prioritize the Scheduling Request over the overlapping UL grant based on a determination that the Scheduling Request is associated with the BFR associated with the one or more Primary Cells). Alternatively and/or additionally, the UE may prioritize an UL grant over an overlapping Scheduling Request (such as a Scheduling Request corresponding to a Scheduling Request transmission occasion overlapping an UL resource of the UL grant) if the Scheduling Request is associated with a BFR associated with one or more Secondary Cells (e.g., the UE may prioritize the UL grant over the overlapping Scheduling Request based on a determination that the overlapping Scheduling Request is associated with the BFR associated with the one or more Secondary Cells).

In some examples, a UE may prioritize a Scheduling Request over an overlapping UL grant (such as an UL grant associated with an UL resource overlapping a Scheduling Request transmission occasion corresponding to the Scheduling Request) if the Scheduling Request is associated with a Listen-before-talk (LBT) failure. For example, the Scheduling Request may be prioritized over the overlapping UL grant based on a determination that the Scheduling Request is associated with the LBT failure. Alternatively and/or additionally, the UE may consider the Scheduling Request to be a prioritized Scheduling Request (e.g., prioritized over the overlapping UL grant). Alternatively and/or additionally, the UE may consider the overlapping UL grant to be a de-prioritized UL grant (e.g., de-prioritized under the Scheduling Request).

Alternatively and/or additionally, a UE may prioritize an UL grant over an overlapping Scheduling Request (such as a Scheduling Request corresponding to a Scheduling Request transmission occasion overlapping an UL resource of the UL grant) if the Scheduling Request is associated with a consistent LBT failure. For example, the UL grant may be prioritized over the overlapping Scheduling Request based on a determination that the overlapping Scheduling Request is associated with the consistent LBT failure. Alternatively and/or additionally, the UE may consider the UL grant to be a prioritized grant (e.g., prioritized over the overlapping Scheduling Request). Alternatively and/or additionally, the UE may consider the overlapping Scheduling Request to be a de-prioritized Scheduling Request (e.g., de-prioritized under the Scheduling Request). In some examples, the consistent LBT failure is a triggered consistent LBT failure and/or is associated with one or more Serving Cells.

In some examples, a first priority of a Scheduling Request associated with a UE may be based on a priority of a first logical channel of the UE. The first priority may be used to determine prioritization between the Scheduling Request and an overlapping UL grant, such as an UL grant associated with an UL resource overlapping a Scheduling Request transmission occasion corresponding to the Scheduling Request. For example, the UE may determine, based on the first priority of the Scheduling Request, whether the overlapping UL grant is prioritized over the Scheduling Request or the Scheduling Request is prioritized over the overlapping UL grant.

In an example, the UE may prioritize the overlapping UL grant over the Scheduling Request if one or more logical channels associated with the overlapping UL grant have a second priority higher than the first priority of the Scheduling Request. The UE may consider the overlapping UL grant to be a prioritized grant (if the second priority is higher than the first priority of the Scheduling Request, for example). The UE may consider the Scheduling Request as a de-prioritized Scheduling Request (if the second priority is higher than the first priority of the Scheduling Request, for example).

Alternatively and/or additionally, the UE may prioritize the Scheduling Request over the overlapping UL grant if the first priority of the Scheduling Request is higher than the second priority of the one or more logical channels associated with the overlapping UL grant. The UE may consider the overlapping UL grant as a de-prioritized grant (if the first priority of the Scheduling Request is higher than the second priority, for example). The UE may consider the Scheduling Request as a prioritized Scheduling Request (if the first priority of the Scheduling Request is higher than the second priority, for example).

In some examples, the UE may use the first priority of the Scheduling Request to determine prioritization between the Scheduling Request and the overlapping UL grant if (and/or when) one or more third conditions associated with the Scheduling Request and/or the overlapping UL grant are met. In some examples, the one or more third conditions are met if the overlapping UL grant is addressed to CS-RNTI of the UE. For example, the UE may use the first priority of the Scheduling Request to determine prioritization between the Scheduling Request and the overlapping UL grant if (and/or when) the overlapping UL grant is addressed to CS-RNTI of the UE. Alternatively and/or additionally, the one or more third conditions are met if the overlapping UL grant is addressed to C-RNTI of the UE. For example, the UE may use the first priority of the Scheduling Request to determine prioritization between the Scheduling Request and the overlapping UL grant if (and/or when) the overlapping UL grant is addressed to C-RNTI of the UE.

In some examples, the first logical channel may be a logical channel with data available for transmission (e.g., the data may be available for transmission when the Scheduling Request is triggered).

Alternatively and/or additionally, the first logical channel may be a logical channel with a highest priority (e.g., among one or more logical channels with data available for transmission, the first logical channel may have the highest priority).

Alternatively and/or additionally, the first logical channel may be a logical channel with a lowest priority (e.g., among one or more logical channels with data available for transmission, the first logical channel may have the lowest priority).

In some examples, the first logical channel may be a logical channel with data available for transmission (e.g., the data may be available for transmission when the Scheduling Request is triggered), wherein the data is allowed to be transmitted on one or more Serving Cells. The one or more Serving Cells may be associated with a triggered BFR associated with the Scheduling Request. Alternatively and/or additionally, the one or more Serving Cells may be associated with a triggered consistent LBT failure associated with the Scheduling Request.

Alternatively and/or additionally, the first logical channel may not be a logical channel that is associated with data not allowed to be transmitted on the one or more Serving Cells.

Alternatively and/or additionally, the first logical channel may be a logical channel with a highest priority (e.g., the first logical channel may have the highest priority among one or more logical channels with data, that is allowed to be transmitted on the one or more Serving Cells, available for transmission).

Alternatively and/or additionally, the first logical channel may be a logical channel with a lowest priority (e.g., the first logical channel may have the lowest priority among one or more logical channels with data, that is allowed to be transmitted on the one or more Serving Cells, available for transmission).

In some examples, the first priority of the Scheduling Request may be associated with data available for transmission on the one or more Serving Cells (associated with the Scheduling Request)). For example, the first priority may correspond to a priority of the data. Alternatively and/or additionally, the first priority may be a priority of a logical channel associated with the data.

In some examples, the first priority of the Scheduling Request may be set to a value, such as a fixed value.

In some examples, a priority of a Scheduling Request (such as a Scheduling Request associated with at least one of a triggered BFR, a LBT failure, a consistent LBT failure, a MAC Control Element (CE), etc.) may be a value (e.g., a fixed value). In an example, the value may be equal to 0, 1, 2, 3, 4, 5, 6, 7, or 8. Other values of the priority are within the scope of the present disclosure. In some examples, the value may be associated with a highest priority (among priorities associated with the UE, for example). For example, the priority of the Scheduling Request may be set to the highest priority. Alternatively and/or additionally, the value may be associated with a lowest priority (among priorities associated with the UE, for example). For example, the priority of the Scheduling Request may be set to the lowest priority.

Alternatively and/or additionally, the priority of the Scheduling Request may be a value configured by a network. In some examples, the priority of the Scheduling Request is independent from logical channel priority (e.g., the priority of the Scheduling Request may be independent from one or more priorities of logical channels associated with the UE). For example, the priority of the Scheduling Request may not be based on a priority of a logical channel.

In some examples, the UE may prioritize an overlapping UL grant (such as an UL grant associated with an UL resource overlapping a Scheduling Request transmission occasion corresponding to the Scheduling Request) over the Scheduling Request if one or more logical channels associated with the overlapping UL grant have a second priority higher than the priority of the Scheduling Request. The UE may consider the overlapping UL grant to be a prioritized grant (e.g., prioritized over the Scheduling Request). The UE may consider the Scheduling Request to be a de-prioritized Scheduling Request (e.g., de-prioritized under the overlapping UL grant).

Alternatively and/or additionally, the UE may prioritize the Scheduling Request over an overlapping UL grant (such as an UL grant associated with an UL resource overlapping a Scheduling Request transmission occasion corresponding to the Scheduling Request) if the priority of the Scheduling Request is higher than a second priority of one or more logical channels associated with the overlapping UL grant. The UE may consider the overlapping UL grant to be a de-prioritized grant (e.g., de-prioritized under the Scheduling Request). The UE may consider the Scheduling Request to be a prioritized Scheduling Request (e.g., prioritized over the Scheduling Request).

In some examples, the priority of the Scheduling Request may be determined based on a cause, a trigger and/or an event that triggered the Scheduling Request.

In an example, the priority of the Scheduling Request may be associated with a highest priority among one or more priorities of one or more logical channels (e.g., one or more logical channels associated with the Scheduling Request and/or one or more logical channels associated with the UE) if the Scheduling Request is triggered in response to a triggered BFR. Alternatively and/or additionally, the priority of the Scheduling Request may be associated with a lowest priority among one or more priorities of one or more logical channels (e.g., one or more logical channels associated with the Scheduling Request and/or one or more logical channels associated with the UE) if the Scheduling Request is triggered in response to a triggered BFR.

Alternatively and/or additionally, the priority of the Scheduling Request may be associated with a highest priority among one or more priorities of one or more logical channels (e.g., one or more logical channels associated with the Scheduling Request and/or one or more logical channels associated with the UE) if the Scheduling Request is triggered in response to a triggered consistent LBT failure. Alternatively and/or additionally, the priority of the Scheduling Request may be associated with a lowest priority among one or more priorities of one or more logical channels (e.g., one or more logical channels associated with the Scheduling Request and/or one or more logical channels associated with the UE) if the Scheduling Request is triggered in response to a triggered consistent LBT failure.

A UE may determine a priority of a Scheduling Request based on priority of a MAC CE. For example, the Scheduling Request may be triggered by a triggered BFR and/or the priority of the Scheduling Request may be associated with a priority of a MAC CE (e.g., a BFR MAC CE) associated with the triggered BFR. The priority of the Scheduling Request may be determined based on the priority of the MAC CE associated with the triggered BFR. In some examples, the UE may compare the priority of the MAC CE (e.g., the BFR MAC CE) with a second priority of one or more logical channels of an overlapping UL grant (such as an UL grant associated with an UL resource overlapping a Scheduling Request transmission occasion corresponding to the Scheduling Request) to determine prioritization between the overlapping UL grant and the Scheduling Request. For example, the UE may compare the priority of the MAC CE with the second priority when determining whether the overlapping UL grant is prioritized or deprioritized (e.g., the UE may compare the priority of the MAC CE with the second priority to determine whether the overlapping UL grant is prioritized or deprioritized).

For example, when an UL grant overlaps with a Scheduling Request triggered by a BFR (such as when an UL resource of the UL grant overlaps with a Scheduling Request transmission occasion corresponding to the Scheduling Request triggered by the BFR), the UE compares a first priority of a BFR MAC CE (associated with the BFR, for example) and a second priority of a logical channel associated with the UL grant to determine whether to prioritize the Scheduling Request or the UL grant. Alternatively and/or additionally, the first priority of the BFR MAC CE associated with the Scheduling Request may have a fixed value. In some examples, the UE may associate a priority of the Scheduling Request with the fixed value of the first priority of the BFR MAC CE.

Alternatively and/or additionally, when an UL grant overlaps with a Scheduling Request triggered by a consistent LBT failure (such as when an UL resource of the UL grant overlaps with a Scheduling Request transmission occasion corresponding to the Scheduling Request triggered by the consistent LBT failure), the UE compares a first priority of a LBT failure MAC CE (associated with the consistent LBT failure, for example) and a second priority of a logical channel associated with the UL grant to determine whether to prioritize the Scheduling Request or the UL grant. Alternatively and/or additionally, the first priority of the LBT failure MAC CE associated with the Scheduling Request may have a fixed value. In some examples, the UE may associate a priority of the Scheduling Request with the fixed value of the first priority of the LBT failure MAC CE.

With respect to one or more embodiments herein, such as one or more techniques, devices, concepts, methods and/or alternatives described above, the UE may be configured to perform one or more determinations associated with prioritization between one or more UL grants and a Scheduling Request. The UE may be configured with lch-basedPrioritization (such as discussed in R2-2002341). A determination associated with prioritization may correspond to a determination of whether a Scheduling Request is prioritized over an UL grant or the UL grant is prioritized over the Scheduling Request.

With respect to one or more embodiments herein, a MAC entity (of the UE, for example) may be configured to perform one or more determinations associated with prioritization between one or more UL grants and a Scheduling Request. The MAC entity may be configured with lch-basedPrioritization (such as discussed in R2-2002341). The MAC entity may be associated with the UL grant and the Scheduling Request.

With respect to one or more embodiments herein, the Scheduling Request may be triggered in response to a triggered BFR. Alternatively and/or additionally, the Scheduling Request may be triggered in response to a consistent LBT failure (e.g., a triggered consistent LBT failure).

With respect to one or more embodiments herein, the UE may not have UL resources (e.g., any UL resource) available for a new transmission (to transmit a BFR MAC CE and/or a LBT failure MAC CE, for example).

With respect to one or more embodiments herein, in a scenario in which the Scheduling Request overlaps with the overlapping UL grant, the Scheduling Request may be associated with a Scheduling Request transmission occasion that overlaps (in time domain, for example) with one or more UL resources associated with the overlapping UL grant.

With respect to one or more embodiments herein, the UE may not perform UL transmission via the one or more UL resources associated with the overlapping UL grant if the overlapping UL grant is considered to be a de-prioritized grant (e.g., de-prioritized under the Scheduling Request). The UE may transmit the Scheduling Request via the Scheduling Request transmission occasion if the Scheduling Request is considered to be a prioritized Scheduling Request (e.g., prioritized over the overlapping UL grant).

With respect to one or more embodiments herein, the UE may perform UL transmission via the one or more UL resources associated with the overlapping UL grant if the overlapping UL grant is considered to be a prioritized grant (e.g., prioritized over the Scheduling Request). The UE may not transmit the Scheduling Request via the Scheduling Request transmission occasion if the Scheduling Request is considered to be a de-prioritized Scheduling Request (e.g., de-prioritized under the overlapping UL grant) and/or if the overlapping UL grant is considered to be a prioritized grant (e.g., prioritized over the Scheduling Request).

With respect to one or more embodiments herein, the UL grant may be for a retransmission. The UL grant may be addressed to CS-RNTI with NDI=1. Alternatively and/or additionally, the UL grant may be addressed to Temporary C-RNTI. The UL grant may be addressed to C-RNTI without a toggled New Data Indicator (NDI) (e.g., the UL grant may be associated with a NDI that is not toggled or the UL grant may not comprise a NDI).

With respect to one or more embodiments herein, the UL grant may be for a new transmission.

With respect to one or more embodiments herein, the one or more UL resources (associated with the UL grant) may be one or more Physical Uplink Shared Channel (PUSCH) resources.

With respect to one or more embodiments herein, the Scheduling Request transmission occasion (associated with the Scheduling Request) may be associated with Physical Uplink Control Channel (PUCCH).

With respect to one or more embodiments herein, the Scheduling Request transmission occasion associated with the Scheduling Request may be indicated in a Scheduling Request configuration (with which the UE is configured, for example).

With respect to one or more embodiments herein, the Scheduling Request configuration may be configured for BFR.

With respect to one or more embodiments herein, the Scheduling Request configuration may be configured for consistent LBT failure.

With respect to one or more embodiments herein, the Scheduling Request may be associated with a triggered BFR.

With respect to one or more embodiments herein, a BFR (e.g., the triggered BFR) may be triggered in response to one or more beam failure indications (amounting to a first number of beam failure indications, for example) from a lower layer of the UE.

With respect to one or more embodiments herein, a BFR (e.g., the triggered BFR) may be associated with a BFR (e.g., a BFR procedure).

With respect to one or more embodiments herein, the Scheduling Request may be associated with a triggered consistent LBT failure.

With respect to one or more embodiments herein, the Scheduling Request may be associated with a triggered CSI reporting MAC CE.

With respect to one or more embodiments herein, the Scheduling Request may not be triggered in response to BSR.

With respect to one or more embodiments herein, the BFR (e.g., the BFR procedure) may be associated with a Secondary Cell.

With respect to one or more embodiments herein, the BFR (e.g., the BFR procedure) may be associated with a Primary Cell.

With respect to one or more embodiments herein, the one or more Serving Cells may comprise a Primary Cell.

With respect to one or more embodiments herein, the one or more Serving Cells may comprise a Secondary Cell.

With respect to one or more embodiments herein, when an UL grant overlaps with a Scheduling Request, one or more UL resources associated with the UL grant overlap with one or more Scheduling Request transmission occasions associated with the Scheduling Request.

With respect to one or more embodiments herein, if a priority of a MAC CE is higher than a priority of a logical channel, the UE may include the MAC CE in a transport block (TB) associated with an UL grant before including data associated with the logical channel.

With respect to one or more embodiments herein, for a logical channel associated with an UL grant, data associated with the logical channel may be included in a TB associated with the UL grant.

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

Figure 10:
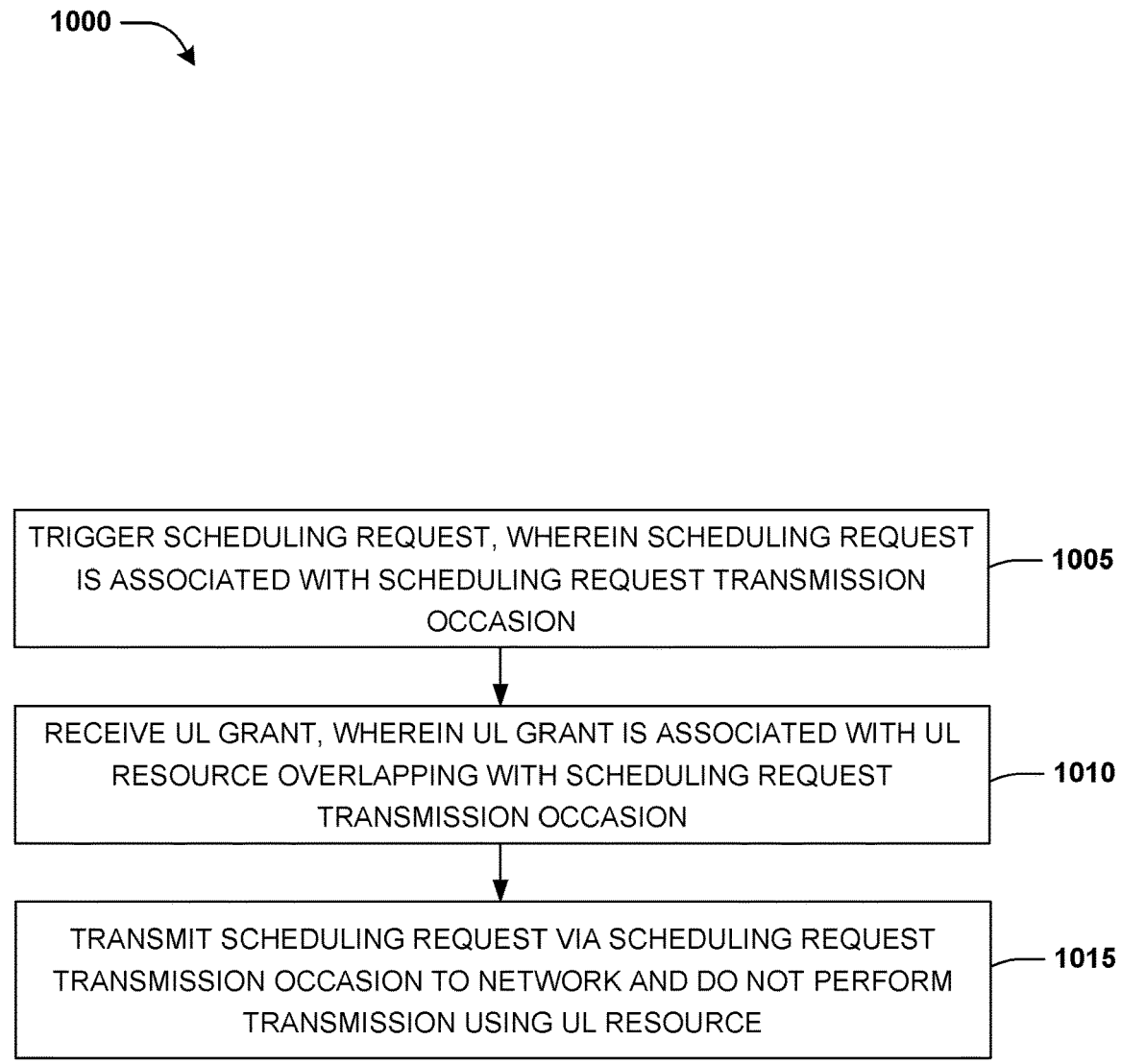
FIG. 10 is a flow chart according to one exemplary embodiment.

FIG. 10 is a flow chart 1000 according to one exemplary embodiment from the perspective of a UE. In step 1005, the UE triggers a scheduling request, wherein the scheduling request is associated with a scheduling request transmission occasion. In step 1010, the UE receives an UL grant, wherein the UL grant is associated with an UL resource overlapping with the scheduling request transmission occasion. In step 1015, the UE transmits the Scheduling Request via the scheduling request transmission occasion to a network and does not perform a transmission using the UL resource.

In one embodiment, the UE considers the UL grant to be a de-prioritized grant.

Referring back to FIGS. 3 and 4, in one exemplary embodiment of a UE, the device 300 includes a program code 312 stored in the memory 310. The CPU 308 may execute program code 312 to enable the UE (i) to trigger a scheduling request, wherein the scheduling request is associated with a scheduling request transmission occasion, (ii) to receive an UL grant, wherein the UL grant is associated with an UL resource overlapping with the scheduling request transmission occasion, and (iii) to transmit the scheduling request via the scheduling request transmission occasion to a network and to not perform a transmission using the UL resource. Furthermore, the CPU 308 can execute the program code 312 to perform one, some and/or all of the above-described actions and steps and/or others described herein.

Figure 11:
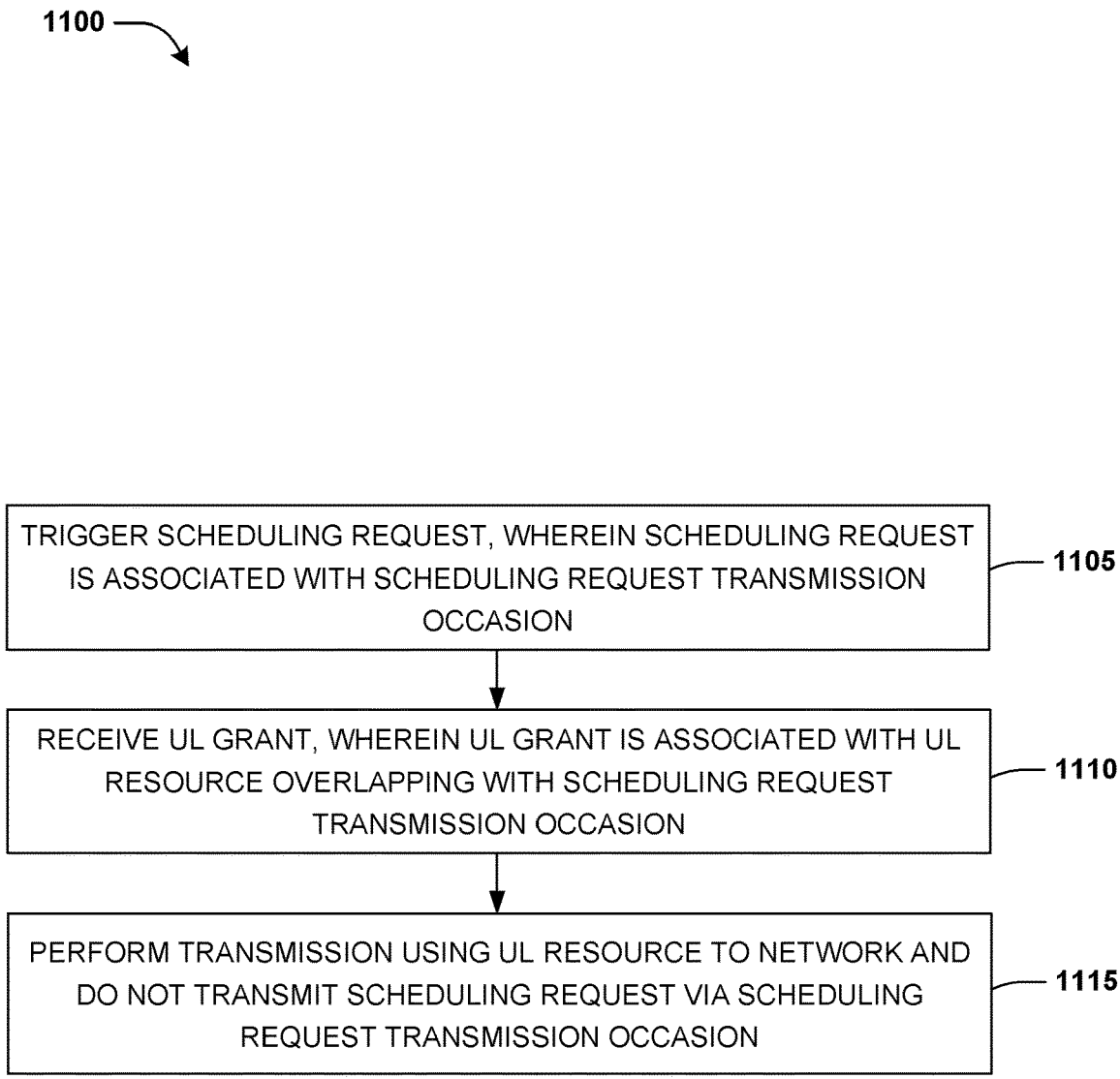
FIG. 11 is a flow chart according to one exemplary embodiment.

FIG. 11 is a flow chart 1100 according to one exemplary embodiment from the perspective of a UE. In step 1105, the UE triggers a scheduling request, wherein the scheduling request is associated with a scheduling request transmission occasion. In step 1110, the UE receives an UL grant, wherein the UL grant is associated with an UL resource overlapping with the scheduling request transmission occasion. In step 1115, the UE performs a transmission using the UL resource to a network and does not transmit the scheduling request via the scheduling request transmission occasion.

In one embodiment, the UE considers the UL grant to be a prioritized grant.

Referring back to FIGS. 3 and 4, in one exemplary embodiment of a UE, the device 300 includes a program code 312 stored in the memory 310. The CPU 308 may execute program code 312 to enable the UE (i) to trigger a scheduling request, wherein the scheduling request is associated with a scheduling request transmission occasion, (ii) to receive an UL grant, wherein the UL grant is associated with an UL resource overlapping with the scheduling request transmission occasion, and (iii) to perform a transmission using the UL resource to a network and not to transmit the scheduling request via the scheduling request transmission occasion. Furthermore, the CPU 308 can execute the program code 312 to perform one, some and/or all of the above-described actions and steps and/or others described herein.

Figure 12:
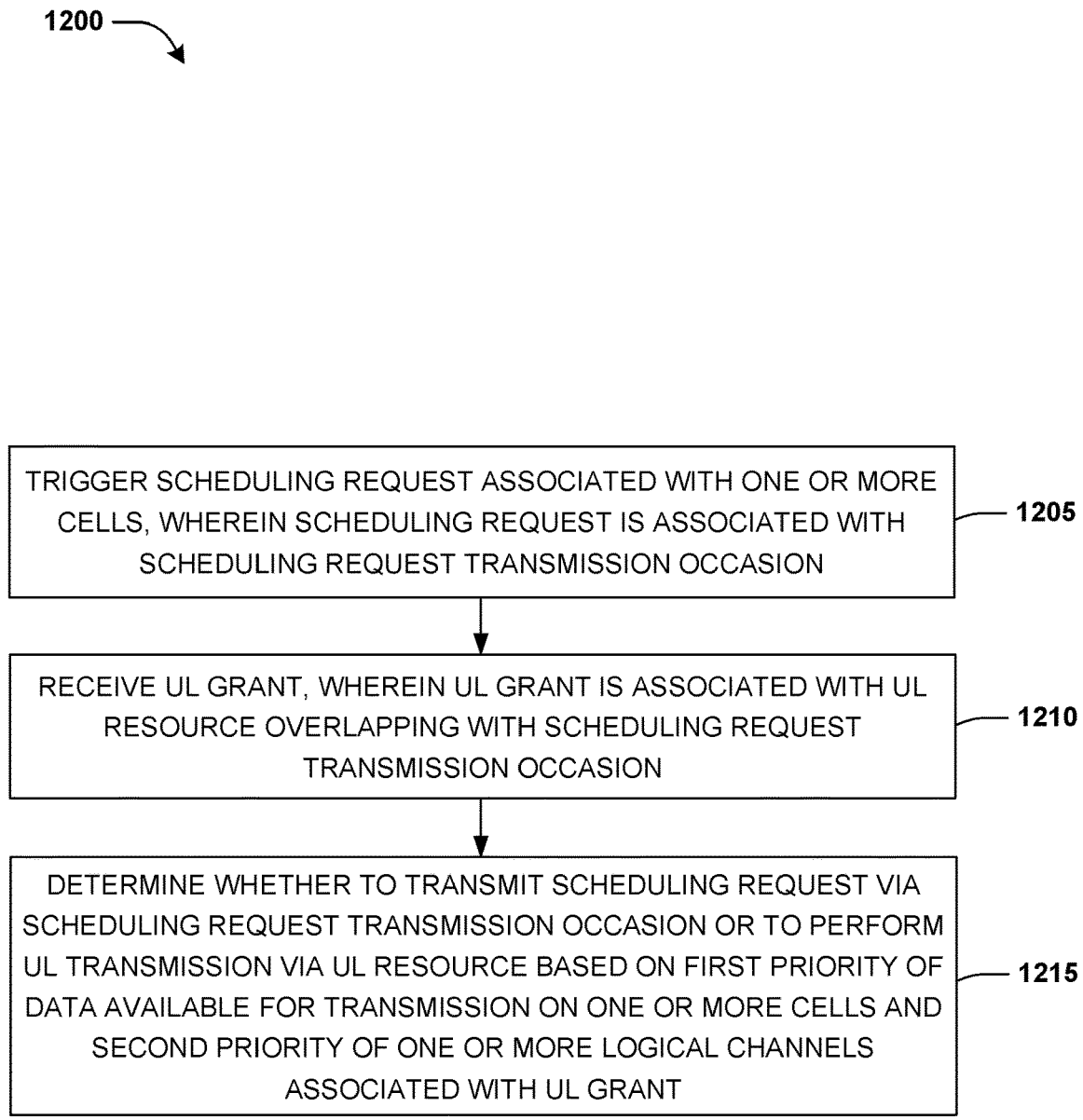
FIG. 12 is a flow chart according to one exemplary embodiment.

FIG. 12 is a flow chart 1200 according to one exemplary embodiment from the perspective of a UE. In step 1205, the UE triggers a scheduling request associated with one or more cells, wherein the scheduling request is associated with a scheduling request transmission occasion. In step 1210, the UE receives an UL grant, wherein the UL grant is associated with an UL resource overlapping with the scheduling request transmission occasion. In step 1215, the UE determines whether to transmit the scheduling request via the scheduling request transmission occasion or to perform an UL transmission via the UL resource based on a first priority of data available for transmission on the one or more cells and a second priority of one or more logical channels associated with the UL grant (and/or based on other information in addition to the first priority of the data available for transmission and the second priority of the one or more logical channels associated with the UL grant).

In one embodiment, the UE transmits the scheduling request (via the scheduling request transmission occasion, for example) if the first priority of the data available for transmission on the one or more cells is higher than the second priority of the one or more logical channels associated with the UL grant.

In one embodiment, the UE performs the UL transmission via the UL resource if the first priority of the data available for transmission on the one or more cells is lower than the second priority of the one or more logical channels associated with the UL grant.

Referring back to FIGS. 3 and 4, in one exemplary embodiment of a UE, the device 300 includes a program code 312 stored in the memory 310. The CPU 308 may execute program code 312 to enable the UE (i) to trigger a scheduling request associated with one or more cells, wherein the scheduling request is associated with a scheduling request transmission occasion, (ii) to receive an UL grant, wherein the UL grant is associated with an UL resource overlapping with the scheduling request transmission occasion, and (iii) to determine whether to transmit the scheduling request via the scheduling request transmission occasion or perform an UL transmission via the UL resource based on a first priority of data available for transmission on the one or more cells and a second priority of one or more logical channels associated with the UL grant (and/or based on other information in addition to the first priority of the data available for transmission and the second priority of the one or more logical channels associated with the UL grant). Furthermore, the CPU 308 can execute the program code 312 to perform one, some and/or all of the above-described actions and steps and/or others described herein.

Figure 13:
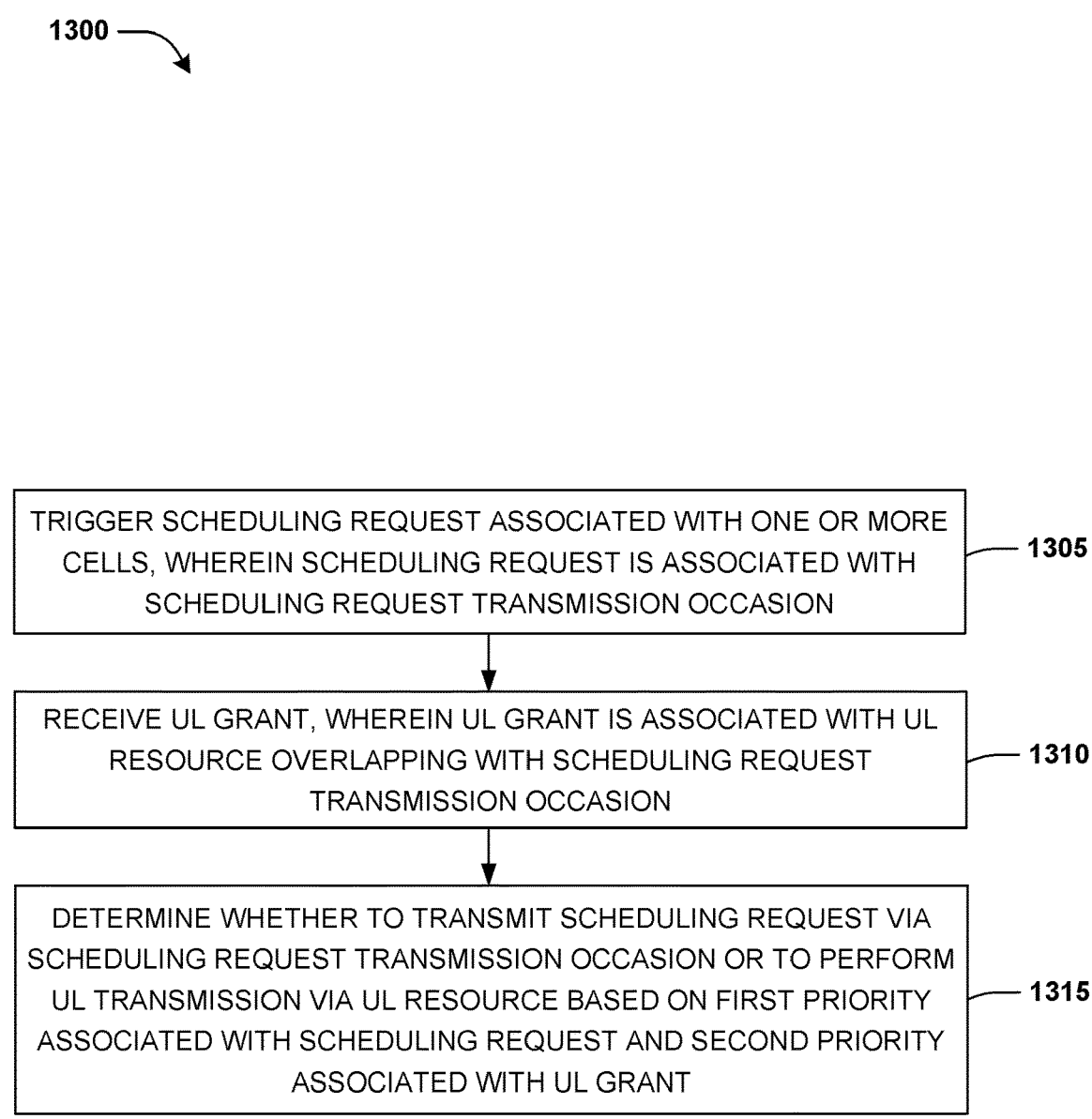
FIG. 13 is a flow chart according to one exemplary embodiment.

FIG. 13 is a flow chart 1300 according to one exemplary embodiment from the perspective of a UE. In step 1305, the UE triggers a scheduling request associated with one or more cells, wherein the scheduling request is associated with a scheduling request transmission occasion. In step 1310, the UE receives an UL grant, wherein the UL grant is associated with an UL resource overlapping with the scheduling request transmission occasion. In step 1315, the UE determines whether to transmit the scheduling request via the scheduling request transmission occasion or to perform an UL transmission via the UL resource based on a first priority associated with the scheduling request and a second priority associated with the UL grant (and/or based on other information in addition to the first priority associated with the scheduling request and the second priority associated with the UL grant).

In one embodiment, the first priority is a pre-configured value (e.g., the pre-configured value may correspond to a value with which the UE is configured prior to triggering the scheduling request) and/or a network-configured value associated with the scheduling request (e.g., a network may configure the UE with the network-configured value).

In one embodiment, the second priority is associated with a logical channel associated with the UL grant (e.g., the second priority may correspond to a priority of the logical channel associated with the UL grant).

In one embodiment, the UE transmits the scheduling request (via the scheduling request transmission occasion, for example) if the first priority is higher than the second priority.

In one embodiment, the UE performs the UL transmission via the UL resource if the first priority is lower than the second priority.

Referring back to FIGS. 3 and 4, in one exemplary embodiment of a UE, the device 300 includes a program code 312 stored in the memory 310. The CPU 308 may execute program code 312 to enable the UE (i) to trigger a scheduling request associated with one or more cells, wherein the scheduling request is associated with a scheduling request transmission occasion, (ii) to receive an UL grant, wherein the UL grant is associated with an UL resource overlapping with the scheduling request transmission occasion, and (iii) to determine whether to transmit the scheduling request via the scheduling request transmission occasion or to perform an UL transmission via the UL resource based on a first priority associated with the scheduling request and a second priority associated with the UL grant (and/or based on other information in addition to the first priority associated with the scheduling request and the second priority associated with the UL grant). Furthermore, the CPU 308 can execute the program code 312 to perform one, some and/or all of the above-described actions and steps and/or others described herein.

With respect to FIGS. 10-13, in one embodiment, the scheduling request is triggered in response to a BFR.

In one embodiment, the scheduling request is associated with a triggered BFR.

In one embodiment, the scheduling request is triggered in response to a consistent LBT failure.

In one embodiment, the scheduling request is triggered in response to a CSI reporting MAC CE.

In one embodiment, the scheduling request is not triggered in response to data available for transmission in a logical channel (e.g., the scheduling request may not be triggered in response to the data becoming available for transmission in the logical channel).

In one embodiment, the scheduling request is not triggered in response to a buffer status report.

In one embodiment, the UE does not transmit the scheduling request if the UE determines to perform the UL transmission (and/or if the UE performs the UL transmission).

In one embodiment, the UE does not perform the UL transmission if the UE determines to transmit the scheduling request (and/or if the UE transmits the scheduling request).

In one embodiment, the BFR is associated with one or more Secondary Cells.

In one embodiment, the BFR is associated with a Primary Cell.

In one embodiment, the UE transmits a BFR MAC CE to the network via a second UL grant provided by the network after transmitting the scheduling request. For example, the network provides the UE with the second UL grant based on and/or in response to receiving the scheduling request.

In one embodiment, the consistent LBT failure is associated with one or more Secondary Cells.

In one embodiment, the consistent LBT failure is associated with a Primary Cell.

Figure 14:
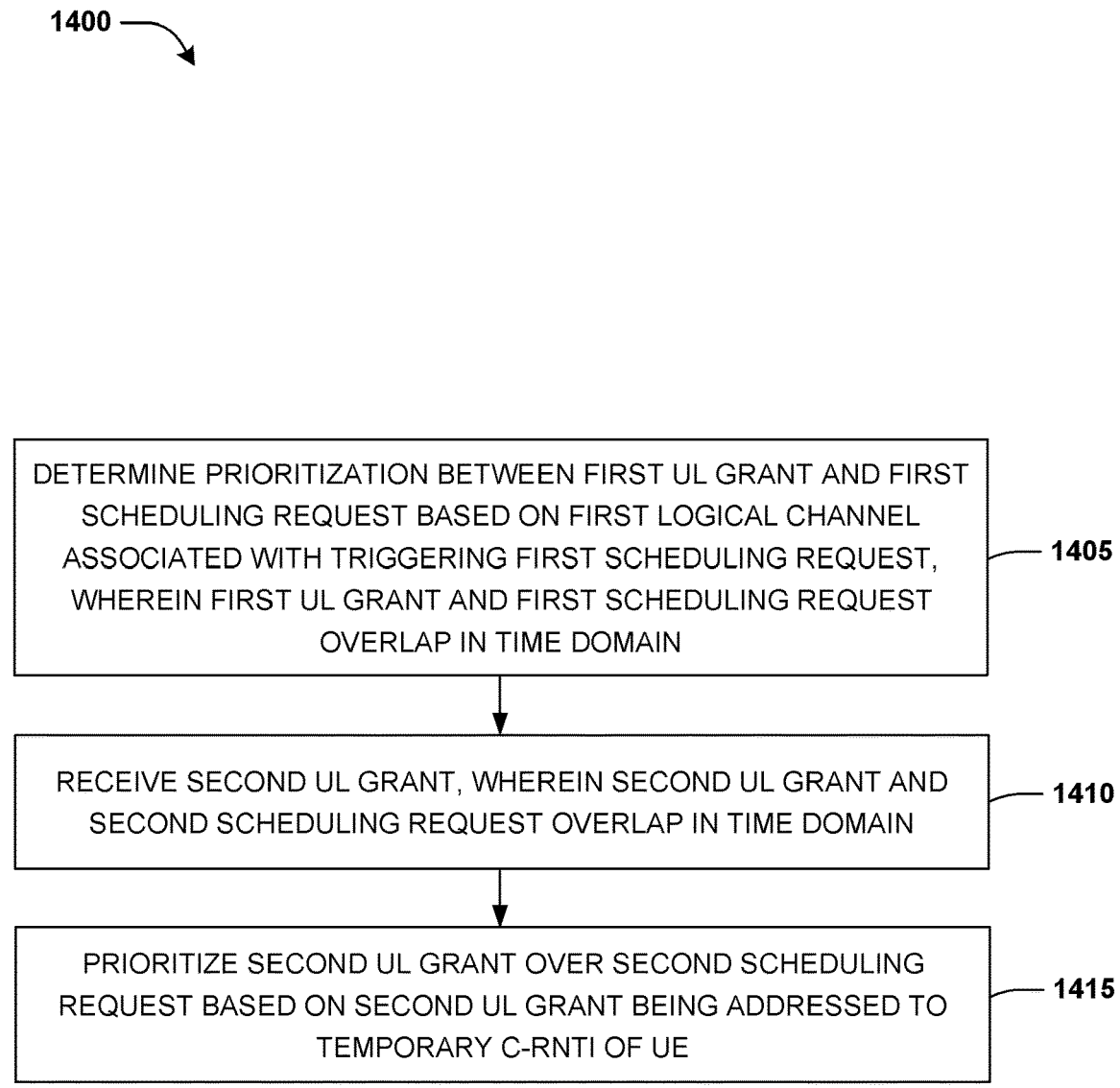
FIG. 14 is a flow chart according to one exemplary embodiment.

FIG. 14 is a flow chart 1400 according to one exemplary embodiment from the perspective of a UE configured with logical channel based prioritization (e.g., lch-basedPrioritization). In step 1405, the UE determines prioritization between a first UL grant and a first scheduling request based on a first logical channel associated with triggering the first scheduling request, wherein the first UL grant and the first scheduling request overlap in time domain. In an example, the prioritization between the first UL grant and the first scheduling request may be based on a priority of the first logical channel associated with triggering the first scheduling request. The first scheduling request may be triggered by the first logical channel. In step 1410, the UE receives a second UL grant, wherein the second UL grant and a second scheduling request overlap in time domain. In step 1415, the UE prioritizes the second UL grant over the second scheduling request based on the second UL grant being addressed to a Temporary C-RNTI of the UE.

In one embodiment, the UE prioritizes the second UL grant over the second scheduling request if (and/or when) the second UL grant is addressed to the Temporary C-RNTI of the UE. In some examples, the UE may prioritize the second UL grant over the second scheduling request, based on the second UL grant being addressed to the Temporary C-RNTI of the UE, regardless of whether a priority of a logical channel associated with the second UL grant is higher or lower than a priority of a logical channel associated with the second scheduling request.

In one embodiment, the UE prioritizing the second UL grant over the second scheduling request comprises the UE considering the second UL grant to be a prioritized grant.

In one embodiment, the UE prioritizing the second UL grant over the second scheduling request comprises the UE considering the second scheduling request to be a de-prioritized scheduling request.

In one embodiment, the UE performs an UL transmission via an UL resource associated with the second UL grant based on the second UL grant being prioritized over the second scheduling request.

In one embodiment, the UE does not transmit the second scheduling request based on the second UL grant being prioritized over the second scheduling request. Alternatively and/or additionally, the UE does not transmit the second scheduling request via a scheduling request transmission occasion associated with the second scheduling request based on the second UL grant being prioritized over the second scheduling request. In an example, the scheduling request transmission occasion may overlap with an UL resource associated with the second UL grant in time domain.

In one embodiment, the UE triggers the second scheduling request in response to a triggered BFR or a triggered consistent LBT failure.

In one embodiment, the UE prioritizing the second UL grant over the second scheduling request is not based on a logical channel associated with triggering the second scheduling request (e.g., prioritization of the second UL grant over the second scheduling request is not based a logical channel that triggered the second scheduling request).

In one embodiment, a first UL resource associated with the first UL grant overlaps with a first scheduling request transmission occasion associated with the first scheduling request. The first UL grant may be a configured UL grant. Alternatively and/or additionally, the configured UL grant may be activated based upon and/or in response to the first UL grant. The first UL resource may be a UL resource associated with the configured UL grant.

In one embodiment, a second UL resource associated with the second UL grant overlaps with a scheduling request transmission occasion associated with the second scheduling request.

In one embodiment, the first UL grant (e.g., a configured UL grant) overlapping with the first scheduling request means that a first UL resource associated with the first UL grant overlaps with a first scheduling request transmission occasion associated with the first scheduling resource, and/or the second UL grant overlapping with the second scheduling request means that a second UL resource associated with the second UL grant overlaps with a scheduling request transmission occasion associated with the second scheduling request.

In one embodiment, the second UL grant is for performing a retransmission (e.g., performing a retransmission using an UL resource associated with the second UL grant).

In one embodiment, the first UL grant is addressed to CS-RNTI with NDI=1 (e.g., the first UL grant is associated with a NDI equal to 1).

In one embodiment, the first UL grant is addressed to a C-RNTI.

In one embodiment, the first UL grant is a configured UL grant.

Referring back to FIGS. 3 and 4, in one exemplary embodiment of a UE configured with logical channel based prioritization (e.g., lch-basedPrioritization), the device 300 includes a program code 312 stored in the memory 310. The CPU 308 may execute program code 312 to enable the UE (i) to determine prioritization between a first UL grant and a first scheduling request based on a first logical channel associated with triggering the first scheduling request, wherein the first UL grant and the first scheduling request overlap in time domain, (ii) to receive a second UL grant, wherein the second UL grant and a second scheduling request overlap in time domain, and (iii) to prioritize the second UL grant over the second scheduling request based on the second UL grant being addressed to a Temporary C-RNTI of the UE. Furthermore, the CPU 308 can execute the program code 312 to perform one, some and/or all of the above-described actions and steps and/or others described herein.

To enhance 3GPP MAC specification for wireless communication in accordance with some embodiments herein, Enhancements 1-4 are provided herein. Enhancements 1-4 are reflective of implementation in accordance with some embodiments herein, and comprise additions to Section 5.4.1 of R2-2002341. According to some embodiments, one, some, and/or all of Enhancements 1-4 and/or one, some, and/or all of Additions 1-7 (discussed below) may be implemented. A portion of Section 5.4.1 of R2-2002341, without any additions of Enhancements 1-4, is quoted below:

When the MAC entity is configured, with lch-basedPrioritization, for each uplink grant which is not already a de-prioritized uplink grant:
1> if this uplink grant is addressed to CS-RNTI with NDI=1 or C-RNTI:
  2> if there is no overlapping PUSCH duration of a configured uplink grant, in the same BWP whose priority is higher than the priority of the uplink grant; and
  2> if there is no overlapping PUCCH resource with an SR transmission where the priority of the logical channel that triggered the SR is higher than the priority of the uplink grant:
    3> this uplink grant is a prioritized uplink grant;
    3> the other overlapping uplink grant(s), if any, is a de-prioritized uplink grant.

1> else if this uplink grant is a configured uplink grant:
  2> if there is no overlapping PUSCH duration of another configured uplink grant, in the same BWP, whose priority is higher than the priority of the uplink grant; and
  2> if there is no overlapping PUSCH duration of an uplink grant addressed to CS-RNTI with NDI=1 or C-RNTI, in the same BWP, whose priority is higher than or equal to the priority of the uplink grant; and
  2> if there is no overlapping PUCCH resource with an SR transmission where the priority of the logical channel that triggered the SR is higher than the priority of the uplink grant:
    3> this uplink grant is a prioritized uplink grant;
    3> the other overlapping uplink grant(s), if any, is a de-prioritized uplink grant.
    [ ... ]

In Enhancement 1, addition 1 and/or addition 2 are made to the portion of Section 5.4.1 of R2-2002341 in accordance with some embodiments of the present disclosure. The addition 1 provides that, when determining whether a UL grant (that is addressed to CS-RNTI with NDI=1 or to C-RNTI) is a prioritized UL grant, a priority of a MAC CE that triggered an overlapping Scheduling Request or a priority of a logical channel that triggered the overlapping Scheduling Request is considered. Without the addition 1 of Enhancement 1, Section 5.4.1 of R2-2002341 provides that merely a priority of a logical channel that triggered the overlapping Scheduling Request is considered when determining whether the UL grant is a prioritized grant (e.g., whether the priority of the MAC CE is higher than a priority of the UL grant is not considered), and thus, a UE may not be able to determine whether the UL grant is a prioritized UL grant and/or the UE may (e.g., incorrectly) determine that the UL grant is a prioritized UL grant even in a scenario in which the priority of the MAC CE that triggered the overlapping Scheduling Request is higher than the priority of the UL grant.

The addition 2 of Enhancement 1 provides that, when determining whether a configured UL grant is a prioritized UL grant, a priority of a MAC CE that triggered an overlapping Scheduling Request or a priority of a logical channel that triggered the overlapping Scheduling Request is considered. Without the addition 2 of Enhancement 1, Section 5.4.1 of R2-2002341 provides that merely a priority of a logical channel that triggered the overlapping Scheduling Request is considered when determining whether the configured UL grant is a prioritized grant (e.g., whether the priority of the MAC CE is higher than a priority of the configured UL grant is not considered), and thus, a UE may not be able to determine whether the configured UL grant is a prioritized UL grant and/or the UE may (e.g., incorrectly) determine that the configured UL grant is a prioritized UL grant even in a scenario in which the priority of the MAC CE that triggered the overlapping Scheduling Request is higher than the priority of the configured UL grant.

The addition 1 of Enhancement 1 is in bold, and is preceded by the term "ADDITION 1 STARTS:" and followed by the term "ADDITION 1 ENDS" to distinguish the addition 1 from what is originally included in Section 5.4.1 of R2-2002341. The addition 2 of Enhancement 1 is in bold, and is preceded by the term "ADDITION 2 STARTS:" and followed by the term "ADDITION 2 ENDS" to distinguish the addition 2 from what is originally included in Section 5.4.1 of R2-2002341.

Enhancement 1:
When the MAC entity is configured, with lch-basedPrioritization, for each uplink grant which is not already a de-prioritized uplink grant:

1> if this uplink grant is addressed to CS-RNTI with NDI=1 or C-RNTI:
  2> if there is no overlapping PUSCH duration of a configured uplink grant, in the same BWP whose priority is higher than the priority of the uplink grant; and
  2> if there is no overlapping PUCCH resource with an SR transmission where the priority of the logical channel ADDITION 1 STARTS: or the MAC CE ADDITION 1 ENDS that triggered the SR is higher than the priority of the uplink grant:
    3> this uplink grant is a prioritized uplink grant;
    3> the other overlapping uplink grant(s), if any, is a de-prioritized uplink grant.
1> else if this uplink grant is a configured uplink grant:
  2> if there is no overlapping PUSCH duration of another configured uplink grant, in the same BWP, whose priority is higher than the priority of the uplink grant; and
  2> if there is no overlapping PUSCH duration of an uplink grant addressed to CS-RNTI with NDI=1 or C-RNTI, in the same BWP, whose priority is higher than or equal to the priority of the uplink grant; and
  2> if there is no overlapping PUCCH resource with an SR transmission where the priority of the logical channel ADDITION 2 STARTS: or the MAC CE that ADDITION 2 ENDS triggered the SR is higher than the priority of the uplink grant:
    3> this uplink grant is a prioritized uplink grant;
    3> the other overlapping uplink grant(s), if any, is a de-prioritized uplink grant.
    [ ... ]

In Enhancement 2, addition 3 and/or addition 4 are made to the portion of Section 5.4.1 of R2-2002341 in accordance with some embodiments of the present disclosure. The addition 3 provides that, when determining whether a UL grant (that is addressed to CS-RNTI with NDI=1 or to C-RNTI) is a prioritized UL grant, a priority of a logical channel that triggered the overlapping Scheduling Request and/or whether the overlapping Scheduling Request is triggered by a BFR is considered (e.g., the UL grant may be determined to be a prioritized UL grant if the priority of the logical channel that triggered the overlapping Scheduling Request is not higher than a priority of the UL grant and the overlapping Scheduling Request is not triggered by a BFR). Without the addition 3 of Enhancement 2, Section 5.4.1 of R2-2002341 provides that merely a priority of a logical channel that triggered the overlapping Scheduling Request is considered when determining whether the UL grant is a prioritized grant (e.g., whether the overlapping Scheduling Request is triggered by a BFR is not considered), and thus, a UE may (e.g., incorrectly) determine that the UL grant is a prioritized UL grant even in a scenario in which the overlapping Scheduling Request is triggered by a BFR.

The addition 4 of Enhancement 2 provides that, when determining whether a configured UL grant is a prioritized UL grant, a priority of a MAC CE that triggered an overlapping Scheduling Request or a priority of a logical channel that triggered the overlapping Scheduling Request and/or whether the overlapping Scheduling Request is triggered by a BFR is considered (e.g., the configured UL grant may be determined to be a prioritized UL grant if the priority of the logical channel that triggered the overlapping Scheduling Request is not higher than a priority of the configured UL grant and the overlapping Scheduling Request is not triggered by a BFR). Without the addition 4 of Enhancement 2, Section 5.4.1 of R2-2002341 provides that merely a priority of a logical channel that triggered the overlapping Scheduling Request is considered when determining whether the configured UL grant (e.g., whether the overlapping Scheduling Request is triggered by a BFR is not considered), and thus, a UE may (e.g., incorrectly) determine that the configured UL grant is a prioritized UL grant even in a scenario in which the overlapping Scheduling Request is triggered by a BFR.

The addition 3 of Enhancement 2 is in bold, and is preceded by the term "ADDITION 3 STARTS:" and followed by the term "ADDITION 3 ENDS" to distinguish the addition 3 from what is originally included in Section 5.4.1 of R2-2002341. The addition 4 of Enhancement 2 is in bold, and is preceded by the term "ADDITION 4 STARTS:" and followed by the term "ADDITION 4 ENDS" to distinguish the addition 4 from what is originally included in Section 5.4.1 of R2-2002341.

Enhancement 2:
When the MAC entity is configured, with lch-basedPrioritization, for each uplink grant which is not already a de-prioritized uplink grant:
    1> if this uplink grant is addressed to CS-RNTI with NDI=1 or C-RNTI:
        2> if there is no overlapping PUSCH duration of a configured uplink grant, in the same BWP whose priority is higher than the priority of the uplink grant; and
        2> if there is no overlapping PUCCH resource with an SR transmission where the priority of the logical channel that triggered the SR is higher than the priority of the uplink grant ADDITION 3 STARTS: or where the SR is triggered by a BFR ADDITION 3 ENDS:
            3> this uplink grant is a prioritized uplink grant;
            3> the other overlapping uplink grant(s), if any, is a de-prioritized uplink grant.
    1> else if this uplink grant is a configured uplink grant:
        2> if there is no overlapping PUSCH duration of another configured uplink grant, in the same BWP, whose priority is higher than the priority of the uplink grant; and
        2> if there is no overlapping PUSCH duration of an uplink grant addressed to CS-RNTI with NDI=1 or C-RNTI, in the same BWP, whose priority is higher than or equal to the priority of the uplink grant; and
        2> if there is no overlapping PUCCH resource with an SR transmission where the priority of the logical channel that triggered the SR is higher than the priority of the uplink grant ADDITION 4 STARTS: or where the SR is triggered by a BFR ADDITION 4 ENDS:
            3> this uplink grant is a prioritized uplink grant;
            3> the other overlapping uplink grant(s), if any, is a de-prioritized uplink grant.
            [ . . . ]

In Enhancement 3, addition 5 and/or addition 6 are made to the portion of Section 5.4.1 of R2-2002341 in accordance with some embodiments of the present disclosure. The addition 5 provides that, when determining whether a UL grant (that is addressed to CS-RNTI with NDI=1 or to C-RNTI) is a prioritized UL grant, a priority of a logical channel that triggered the overlapping Scheduling Request and/or whether the overlapping Scheduling Request is triggered by a consistent LBT failure is considered (e.g., the UL grant may be determined to be a prioritized UL grant if the priority of the logical channel that triggered the overlapping Scheduling Request is not higher than a priority of the UL grant and the overlapping Scheduling Request is not triggered by a consistent LBT failure). Without the addition 5 of Enhancement 3, Section 5.4.1 of R2-2002341 provides that merely a priority of a logical channel that triggered the overlapping Scheduling Request is considered when determining whether the UL grant is a prioritized grant (e.g., whether the overlapping Scheduling Request is triggered by a consistent LBT failure is not considered), and thus, a UE may (e.g., incorrectly) determine that the UL grant is a prioritized UL grant even in a scenario in which the overlapping Scheduling Request is triggered by a consistent LBT failure.

The addition 6 of Enhancement 3 provides that, when determining whether a configured UL grant is a prioritized UL grant, a priority of a MAC CE that triggered an overlapping Scheduling Request or a priority of a logical channel that triggered the overlapping Scheduling Request and/or whether the overlapping Scheduling Request is triggered by a consistent LBT failure is considered (e.g., the configured UL grant may be determined to be a prioritized UL grant if the priority of the logical channel that triggered the overlapping Scheduling Request is not higher than a priority of the configured UL grant and the overlapping Scheduling Request is not triggered by a consistent LBT failure). Without the addition 6 of Enhancement 3, Section 5.4.1 of R2-2002341 provides that merely a priority of a logical channel that triggered the overlapping Scheduling Request is considered when determining whether the configured UL grant (e.g., whether the overlapping Scheduling Request is triggered by a consistent LBT failure is not considered), and thus, a UE may (e.g., incorrectly) determine that the configured UL grant is a prioritized UL grant even in a scenario in which the overlapping Scheduling Request is triggered by a consistent LBT failure.

The addition 5 of Enhancement 3 is in bold, and is preceded by the term "ADDITION 5 STARTS:" and followed by the term "ADDITION 5 ENDS" to distinguish the addition 5 from what is originally included in Section 5.4.1 of R2-2002341. The addition 6 of Enhancement 3 is in bold, and is preceded by the term "ADDITION 6 STARTS:" and followed by the term "ADDITION 6 ENDS" to distinguish the addition 6 from what is originally included in Section 5.4.1 of R2-2002341.

Enhancement 3:
When the MAC entity is configured, with lch-basedPrioritization, for each uplink grant which is not already a de-prioritized uplink grant:
    1> if this uplink grant is addressed to CS-RNTI with NDI=1 or C-RNTI:
        2> if there is no overlapping PUSCH duration of a configured uplink grant, in the same BWP whose priority is higher than the priority of the uplink grant; and
        2> if there is no overlapping PUCCH resource with an SR transmission where the priority of the logical channel that triggered the SR is higher than the priority of the uplink grant ADDITION 5 STARTS: or where the SR is triggered by a consistent LBT failure ADDITION 5 ENDS:
            3> this uplink grant is a prioritized uplink grant;
            3> the other overlapping uplink grant(s), if any, is a de-prioritized uplink grant.
    1> else if this uplink grant is a configured uplink grant:
        2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant ADDITION 6 STARTS: or where the SR is triggered by a consistent LBT failure ADDITION 6 ENDS:

3> this uplink grant is a prioritized uplink grant;

3> the other overlapping uplink grant(s), if any, is a de-prioritized uplink grant.

[ . . . ]

In Enhancement 4, addition 7 is made to Section 5.4.1 of R2-2002341 in accordance with some embodiments of the present disclosure. The addition 7 provides that a MAC entity (of a UE, for example) considers that a logical channel that triggers the Scheduling Request is the highest priority logical channel that has data available for transmission at a time at which the Scheduling Request is triggered. For example, the highest priority logical channel (e.g., a logical channel with a highest priority among one or more logical channels that have data available for transmission at the time at which the Scheduling Request is triggered) may be considered to be a logical channel that triggers the Scheduling Request. Accordingly, when determining whether a UL grant (e.g., a configured UL grant and/or a UL grant that is addressed to CS-RNTI with NDI=1 or to C-RNTI) is a prioritized UL grant, a priority of the highest priority logical channel may be considered to be a priority of the logical channel that triggered the overlapping Scheduling Request (e.g., the UL grant may be determined to be a prioritized UL grant if the priority of the highest priority logical channel is not higher than a priority of the UL grant). Accordingly, the UE may determine prioritization between the Scheduling Request and the UL grant even in a scenario in which the Scheduling Request is not triggered by a logical channel (due to the highest priority logical channel being considered to be a logical channel that triggers the Scheduling Request).

Addition 7 of Enhancement 4 is as follows:

For SR(s) triggered for SCell beam failure recovery, the MAC entity considers that the logical channel that triggered the SR is the highest priority logical channel that has data available for transmission at the time the SR is triggered.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 10-14. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 10-14, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling a UE to determine prioritization between an UL grant and an overlapping Scheduling Request, and/or enabling the UE to determine prioritization between a PUSCH transmission (corresponding to a transmission via an UL resource associated with the UL grant, for example) and a PUCCH transmission (corresponding to transmission of the overlapping Scheduling Request via a Scheduling Request transmission occasion, for example). Alternatively and/or additionally, ambiguity relating to determining prioritization between the UL grant and the overlapping Scheduling Request (and/or determining prioritization between the PUSCH transmission and the PUCCH transmission) is solved. Alternatively and/or additionally, applying one or more of the techniques presented herein may result in preventing and/or reducing random access procedure latency, such as due to enabling the UE to prioritize the UL grant over the overlapping Scheduling Request based upon the UL grant being addressed to a Temporary C-RNTI (whereas, in some systems, a Scheduling Request may be prioritized over a UL grant addressed to a Temporary C-RNTI, such as due to priorities of the UL grant and the Scheduling Request, which may lead to obstruction of a random access procedure and/or may delay and/or prevent completion of the random access procedure).

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) configured with logical channel based prioritization, the method comprising:
receiving a first uplink (UL) grant not addressed to a Temporary Cell Radio Network Temporary Identifier (C-RNTI) of the UE, wherein the first UL grant and a first scheduling request overlap in time domain;
determining a first logical channel associated with triggering the first scheduling request;
determining prioritization between the first UL grant and the first scheduling request based on the first logical channel associated with triggering the first scheduling request;
receiving a second UL grant addressed to the Temporary C-RNTI of the UE, wherein the second UL grant and a second scheduling request overlap in time domain; and
prioritizing the second UL grant over the second scheduling request if the second UL grant is addressed to the Temporary C-RNTI of the UE.

2. The method of claim 1, wherein:
the prioritizing the second UL grant over the second scheduling request comprises considering the second UL grant to be a prioritized grant.

3. The method of claim 1, wherein:
the prioritizing the second UL grant over the second scheduling request comprises considering the second scheduling request to be a de-prioritized scheduling request.

4. The method of claim 1, comprising:
performing, based on the prioritizing the second UL grant over the second scheduling request, an UL transmission via an UL resource associated with the second UL grant.

5. The method of claim 1, comprising:
not transmitting the second scheduling request based on the prioritizing the second UL grant over the second scheduling request.

6. The method of claim 1, comprising:
triggering the second scheduling request responsive to a triggered beam failure recovery (BFR) or a triggered consistent listen-before-talk (LBT) failure.

7. The method of claim 1, wherein:
the prioritizing the second UL grant over the second scheduling request is not based on a logical channel associated with triggering the second scheduling request.

8. The method of claim 1, wherein at least one of:
a first UL resource associated with the first UL grant overlaps with a first scheduling request transmission occasion associated with the first scheduling request; or
a second UL resource associated with the second UL grant overlaps with a second scheduling request transmission occasion associated with the second scheduling request.

9. The method of claim 1, wherein:
the second UL grant is for performing a retransmission.

10. The method of claim 1, wherein at least one of:
the first UL grant is addressed to a Configured Scheduling Radio Network Temporary Identifier (CS-RNTI) and is associated with a New Data Indicator (NDI) equal to 1;
the first UL grant is addressed to a C-RNTI; or
the first UL grant is a configured UL grant.

11. A User Equipment (UE) configured with logical channel based prioritization, the UE comprising:
a control circuit;
a processor installed in the control circuit; and
a memory installed in the control circuit and operatively coupled to the processor, wherein the processor is configured to execute a program code stored in the memory to perform operations, the operations comprising:
receiving a first uplink (UL) grant not addressed to a Temporary Cell Radio Network Temporary Identifier (C-RNTI) of the UE, wherein the first UL grant and a first scheduling request overlap in time domain;
determining a first logical channel associated with triggering the first scheduling request;
determining prioritization between the first UL grant and the first scheduling request based on the first logical channel associated with triggering the first scheduling request;
receiving a second UL grant addressed to the Temporary C-RNTI of the UE, wherein the second UL grant and a second scheduling request overlap in time domain; and
prioritizing the second UL grant over the second scheduling request if the second UL grant is addressed to the Temporary C-RNTI of the UE.

12. The UE of claim 11, wherein:
the prioritizing the second UL grant over the second scheduling request comprises considering the second UL grant to be a prioritized grant.

13. The UE of claim 11, wherein:
the prioritizing the second UL grant over the second scheduling request comprises considering the second scheduling request to be a de-prioritized scheduling request.

14. The UE of claim 11, the operations comprising:
performing, based on the prioritizing the second UL grant over the second scheduling request, an UL transmission via an UL resource associated with the second UL grant.

15. The UE of claim 11, the operations comprising:
not transmitting the second scheduling request based on the prioritizing the second UL grant over the second scheduling request.

16. The UE of claim 11, the operations comprising:
triggering the second scheduling request responsive to a triggered beam failure recovery (BFR) or a triggered consistent listen-before-talk (LBT) failure.

17. The UE of claim 11, wherein:
the prioritizing the second UL grant over the second scheduling request is not based on a logical channel associated with triggering the second scheduling request.

18. The UE of claim 11, wherein:
the second UL grant is for performing a retransmission.

19. The UE of claim 11, wherein at least one of:
the first UL grant is addressed to a Configured Scheduling Radio Network Temporary Identifier (CS-RNTI) and is associated with a New Data Indicator (NDI) equal to 1;
the first UL grant is addressed to a C-RNTI; or
the first UL grant is a configured UL grant.

20. A non-transitory computer-readable medium comprising processor-executable instructions that, when executed by a User Equipment (UE) configured with logical channel based prioritization, cause performance of operations, the operations comprising:
receiving a first uplink (UL) grant not addressed to a Temporary Cell Radio Network Temporary Identifier (C-RNTI) of the UE, wherein the first UL grant and a first scheduling request overlap in time domain;
determining a first logical channel associated with triggering the first scheduling request;
determining prioritization between the first UL grant and the first scheduling request based on the first logical channel associated with triggering the first scheduling request;
receiving a second UL grant addressed to the Temporary C-RNTI of the UE, wherein the second UL grant and a second scheduling request overlap in time domain; and
prioritizing the second UL grant over the second scheduling request if the second UL grant is addressed to the Temporary C-RNTI of the UE.

\* \* \* \* \*